United States Patent
Sawada

(10) Patent No.: US 12,555,251 B2
(45) Date of Patent: Feb. 17, 2026

(54) INSPECTION SYSTEM FOR DECISION MAKING SUPPORT

(71) Applicant: NEC Corporation, Tokyo (JP)

(72) Inventor: Azusa Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 18/559,634

(22) PCT Filed: May 17, 2021

(86) PCT No.: PCT/JP2021/018652
§ 371 (c)(1),
(2) Date: Nov. 8, 2023

(87) PCT Pub. No.: WO2022/244075
PCT Pub. Date: Nov. 24, 2022

(65) Prior Publication Data
US 2025/0078289 A1    Mar. 6, 2025

(51) Int. Cl.
*G06T 7/246*    (2017.01)
*G01N 21/90*    (2006.01)
(Continued)

(52) U.S. Cl.
CPC ............. *G06T 7/248* (2017.01); *G01N 21/90* (2013.01); *G06T 7/0012* (2013.01);
(Continued)

(58) Field of Classification Search
None
See application file for complete search history.

(56) References Cited

U.S. PATENT DOCUMENTS

| 7,982,868 B2 * | 7/2011 | Akkerman | G01N 21/9036 356/240.1 |
| 11,313,808 B2 * | 4/2022 | Werk | G01N 21/9027 |

(Continued)

FOREIGN PATENT DOCUMENTS

| CN | 104215584 A | 12/2014 |
| JP | 2011-153944 A | 8/2011 |

(Continued)

OTHER PUBLICATIONS

International Search Report for PCT Application No. PCT/JP2021/018652, mailed on Aug. 3, 2021.
(Continued)

*Primary Examiner* — Nancy Bitar
(74) *Attorney, Agent, or Firm* — Sughrue Mion, PLLC

(57) ABSTRACT

An inspection system includes: an identification model learning means that performs machine-learning of a model identifying the type of a target object from time-series data representing the movement trajectory of the target object obtained by observation; a confidence level prediction model learning means that performs machine-learning of a confidence level prediction model estimating the confidence level of an estimation result by the identification model from the observation specification of time-series data representing the movement trajectory of a target object; and a determining means that uses the learned identification model to estimate the type of a target object from the movement trajectory of the target object obtained by observation, and uses the learned confidence level prediction model to predict the confidence level of an estimation result by the identification model from the observation specification of the time-series data.

10 Claims, 14 Drawing Sheets

(51) Int. Cl.
  *G06T 7/00* (2017.01)
  *G06V 10/764* (2022.01)
  *G06V 10/774* (2022.01)
  *G06V 10/776* (2022.01)
(52) U.S. Cl.
  CPC .......... *G06V 10/764* (2022.01); *G06V 10/774* (2022.01); *G06V 10/776* (2022.01); *G06T 2207/10016* (2013.01); *G06T 2207/20076* (2013.01); *G06T 2207/20081* (2013.01); *G06T 2207/30004* (2013.01); *G06T 2207/30241* (2013.01)

(56) References Cited

U.S. PATENT DOCUMENTS

| | | | | |
|---|---|---|---|---|
| 11,373,285 B2* | 6/2022 | Higa | .................. | G06T 7/0002 |
| 12,360,054 B2* | 7/2025 | Yachida | ............. | G01N 21/8851 |
| 2018/0322660 A1 | 11/2018 | Smith | | |
| 2019/0228527 A1* | 7/2019 | Ramirez | .................. | G06T 7/41 |

FOREIGN PATENT DOCUMENTS

| | | |
|---|---|---|
| JP | 2019-174346 A | 10/2019 |
| JP | 2019-529882 A | 10/2019 |
| JP | 2019-215376 A | 12/2019 |

OTHER PUBLICATIONS

Charles Corbiere et al., "Addressing Failure Prediction by Learning Model Confidence", NeurIPS2019.

* cited by examiner

INSPECTION SYSTEM FOR DECISION MAKING SUPPORT

This application is a National Stage Entry of PCT/JP2021/018652 filed on May 17, 2021, the contents of all of which are incorporated herein by reference, in their entirety.

TECHNICAL FIELD

The present invention relates to an inspection system, an inspection method, and a recording medium.

BACKGROUND ART

Inspection systems that inspect whether or not a foreign object is present in a liquid encapsulated in a transparent or translucent container has been proposed.

For example, a method and an apparatus for acquiring time-series data representing the trajectory of a particle in a liquid obtained by observation and determining the type of a particle (glass fragment or the like) based on the abovementioned trajectory of the particle are proposed (see Patent Literature 1, for example).

Further, a method and an apparatus for acquiring the way of movement (movement trajectory or the like) of an object in a liquid by observation, comparing the acquired way of movement of the object with the way of movement of a foreign object in a liquid learned in advance, and thereby inspecting whether or not a foreign object is present in a liquid are proposed (see Patent Literature 2, for example).

On the other hand, a method and apparatus for predicting the confidence level of an identification result output by an identification model that is configured by a deep neural network to perform image identification are proposed (see Non-Patent Literature 1, for example). Specifically, a confidence level prediction model is used that uses, as training data, a middle feature value derived from a learned identification model when an image is input to the identification model and a true class probability (TCP) and that is obtained by machine learning with the middle feature value of the image obtained from the identification model as an input and the confidence level of an identification result by the identification model as an output.

CITATION LIST

Patent Literature

Patent Literature 1: Japanese Unexamined Patent Application Publication No. JP-A 2019-215376
Patent Literature 2: Japanese Unexamined Patent Application Publication No. JP-A 2019-174346

Non-Patent Literature

Non-Patent Literature 1: Charles Corbiere et al., "Addressing Failure Prediction by Learning Model Confidence" (NeurIPS2019)

SUMMARY OF INVENTION

Technical Problem

An identification result by a model that identifies the type of an object (for example, foreign object or air bubble) based on time-series data representing the movement trajectory of an object in a liquid obtained by observation is not absolutely reliable at all times, and may be wrong. Especially in an application where a mistake has a serious consequence for in-liquid foreign object inspection of a liquid pharmaceutical like an injection formulation, it is important to be able to predict the certainty of an identification result by an identification model.

In the method described in Non-Patent Literature 1, a confidence level prediction model is learned using, as training data, a middle feature value derived from a learned identification model when an identification target image is input to the identification model and a true class probability. However, in a configuration to learn a confidence level prediction model using (the middle feature value of) an input image as training data, it is difficult to differentiate between the confidence levels of a plurality of results estimated from a plurality of similar input images. Consequently, in the method described in Non-Patent Literature 1, it is difficult to differentiate between the confidence levels of results estimated from time-series data representing movement trajectories similar to each other obtained by insufficient observation from a plurality of objects of different types.

The present invention is to provide an inspection system that solves the abovementioned problem.

Solution to Problem

An inspection system as an aspect of the present invention includes: an identification model learning means that uses time-series data representing a movement trajectory of a target object obtained by observation and a type of the target object as first training data, and thereby learns an identification model estimating a type of a target object from time-series data representing a movement trajectory of the target object obtained by observation; a confidence level prediction model learning means that uses time-series data representing a movement trajectory of a target object obtained by observation, an observation specification thereof, and a type of the target object as second training data, and thereby learns a confidence level prediction model predicting a confidence level of an estimation result by the identification model from an observation specification of time-series data representing a movement trajectory of a target object obtained by observation; and a determining means that uses the learned identification model to estimate a type of a target object from time-series data representing a movement trajectory of the target object obtained by observation, and uses the learned confidence level prediction model to predict a confidence level of an estimation result by the identification model from an observation specification of the time-series data.

Further, an inspection method as an aspect of the present invention includes: using time-series data representing a movement trajectory of a target object obtained by observation and a type of the target object as first training data, and thereby learning an identification model estimating a type of a target object from time-series data representing a movement trajectory of the target object obtained by observation; using time-series data representing a movement trajectory of a target object obtained by observation, an observation specification thereof, and a type of the target object as second training data, and thereby learning a confidence level prediction model predicting a confidence level of an estimation result by the identification model from an observation specification of time-series data representing a movement trajectory of a target object obtained by observation; and using the learned identification model to estimate a type of a target object from time-series data representing a movement trajectory of the target object obtained by observation, and using the learned confidence level prediction model to predict a confidence level of an estimation result by the identification model from an observation specification of the time-series data.

Further, a non-transitory computer-readable recording medium as an aspect of the present invention has a program recorded thereon, and the program includes instructions for causing a computer to execute processes to: use time-series data representing a movement trajectory of a target object obtained by observation and a type of the target object as first training data, and thereby learn an identification model estimating a type of a target object from time-series data representing a movement trajectory of the target object obtained by observation; use time-series data representing a movement trajectory of a target object obtained by observation, an observation specification thereof, and a type of the target object as second training data, and thereby learn a confidence level prediction model predicting a confidence level of an estimation result by the identification model from an observation specification of time-series data representing a movement trajectory of a target object obtained by observation; and use the learned identification model to estimate a type of a target object from time-series data representing a movement trajectory of the target object obtained by observation, and use the learned confidence level prediction model to predict a confidence level of an estimation result by the identification model from an observation specification of the time-series data.

Advantageous Effects of Invention

With the configurations as described above, even if time-series data represent a plurality of movement trajectories similar to each other obtained by observation from a plurality of objects of different types, when the observation specifications thereof are different, the present invention can differentiate between the confidence levels of results estimated from the time-series data.

DESCRIPTION OF EXAMPLE EMBODIMENTS

Next, a first example embodiment of the present invention will be described in detail with reference to the drawings.

Figure 1:
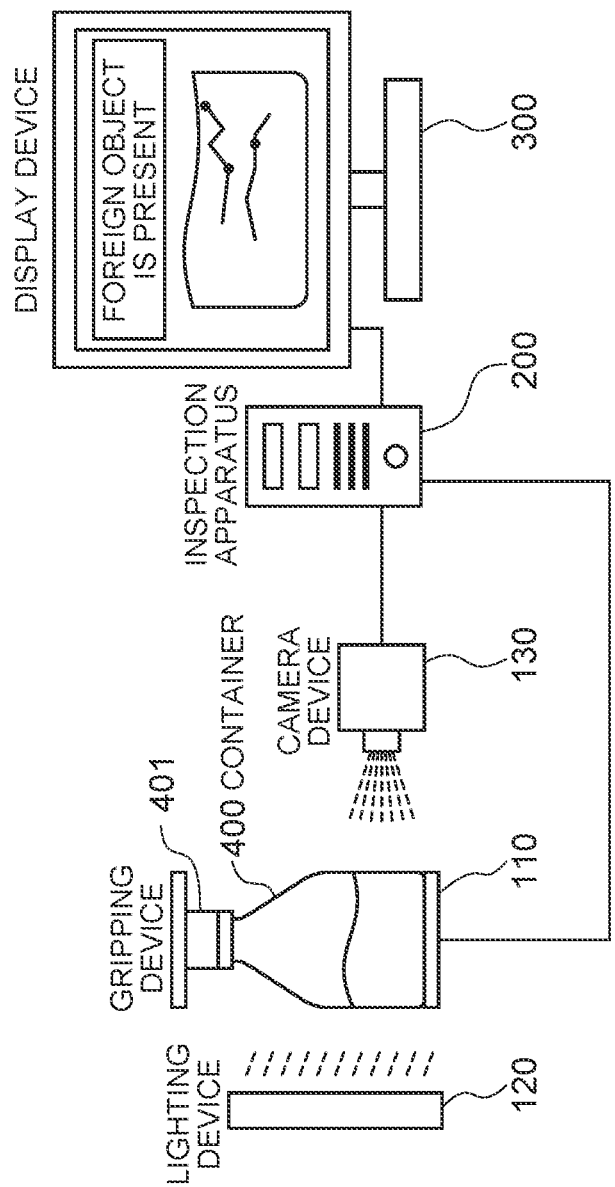
FIG. 1 is a block diagram of an inspection system in a first example embodiment of the present invention.

FIG. 1 is a block diagram of an inspection system 100 according to the first example embodiment of the present invention. Referring to FIG. 1, the inspection system 100 is a system that inspects whether or not a foreign object is present in a liquid encapsulated in a container 400. The inspection system 100 includes, as major components, a gripping device 110, a lighting device 120, a camera device 130, an inspection apparatus 200, and a display device 300.

The container 400 is a transparent or translucent container such as a glass bottle and a plastic bottle. A liquid such as medicine and water is encapsulated/filled in the container 400. There is a possibility that a foreign object is mixed in the liquid encapsulated in the container 400. Assumed foreign objects are, for example, a glass fragment, a plastic fragment, a rubber fragment, hair, fiber fragment, and soot.

The gripping device 110 is configured to grip the container 400 in a predetermined posture. The predetermined posture may be any posture. For example, the predetermined posture may be a posture when the container 400 is upright. Alternatively, the predetermined posture may be a posture in which the container 400 is tiled at a predetermined angle from the upright posture. In the following description, the posture in which the container 400 is upright will be the predetermined posture. A mechanism that grips the container 400 in the upright posture may be any mechanism. For example, the gripping mechanism may include a pedestal where the container 400 is placed in the upright posture, a member that presses the upper surface part of a cap 401 that is the top of the container 400 placed on the pedestal, and so forth.

Further, the gripping device 110 is configured to tilt, swing, or rotate the container 400 in a predetermined direction from the upright posture while gripping the container 400. A mechanism that tilts, swings, or rotates the container 400 may be any mechanism. For example, the mechanism that tilts, swings or rotates may include a motor that tilts, swings, or rotates the entire gripping mechanism while gripping the container 400.

Further, the gripping device 110 is connected to the inspection apparatus 200 using wired or wireless communication. When activated according to an instruction from the inspection apparatus 200, the gripping device 110 tilts, swings, or rotates the container 400 from the upright posture in a predetermined direction while gripping the container 400. When stopped according to an instruction from the inspection apparatus 200, the gripping device 110 stops the operation to tilt, swing or rotate the container 400, and returns to the state where it grips the container 400 in the upright posture.

When the container 400 is tilted, swung, or rotated as described above and then kept stationary, a state in which the liquid flows by inertia in the stationary container 400 is obtained. When the liquid flows, a state in which a foreign object mixed in the liquid floats is obtained. Moreover, when the liquid flows, an air bubble adhering to the inner wall surface of the container 400 and an air bubble mixed in the process that the liquid flows may float in the liquid. Therefore, the inspection apparatus 200 needs to identify whether the floating object is a foreign object or an air bubble.

The lighting device 120 is configured to emit illumination light onto the liquid encapsulated in the container 400. The lighting device 120 is, for example, a surface light source having a size corresponding to the size of the container 400. The lighting device 120 is installed on a side opposite a side where the camera device 130 is installed as seen from the container 400. That is to say, illumination by the lighting device 120 is transmitted illumination. However, the position of the lighting device 120 is not limited to the above and, for example, the lighting device 120 may be installed on the bottom side of the container 400 or at a position adjacent to the camera device 130, for imaging as reflected light illumination.

The camera device 130 is an imaging device that consecutively images the liquid in the container 400 at a predetermined frame rate from a predetermined position on a side opposite the side where the lighting device 120 is installed as seen from the container 400. The camera device 130 may include, for example, a color camera equipped with a CCD (Charge-Coupled Device) image sensor or a CMOS (Complementary MOS) image sensor having a pixel capacity of about several million pixels. The camera device 130 is connected to the inspection apparatus 200 using wired or wireless communication. The camera device 130 is configured to transmit time-series images obtained by imaging to the inspection apparatus 200 together with information indicating the time of imaging, and so forth.

The display device 300 is a display device such as an LCD (Liquid Crystal Display). The display device 300 is connected to the inspection apparatus 200 using wired or wireless communication. The display device 300 is configured to display the result of inspection of the container 400 performed by the inspection apparatus 200, and so forth.

The inspection apparatus 200 is an information processing apparatus that performs image processing on the obtained time-series images captured by the camera device 130 and inspects whether or not a foreign object is present in the liquid encapsulated in the container 400. The inspection apparatus 200 is connected to the gripping device 110, the camera device 130 and the display device 300 using wired or wireless communication.

Figure 2:
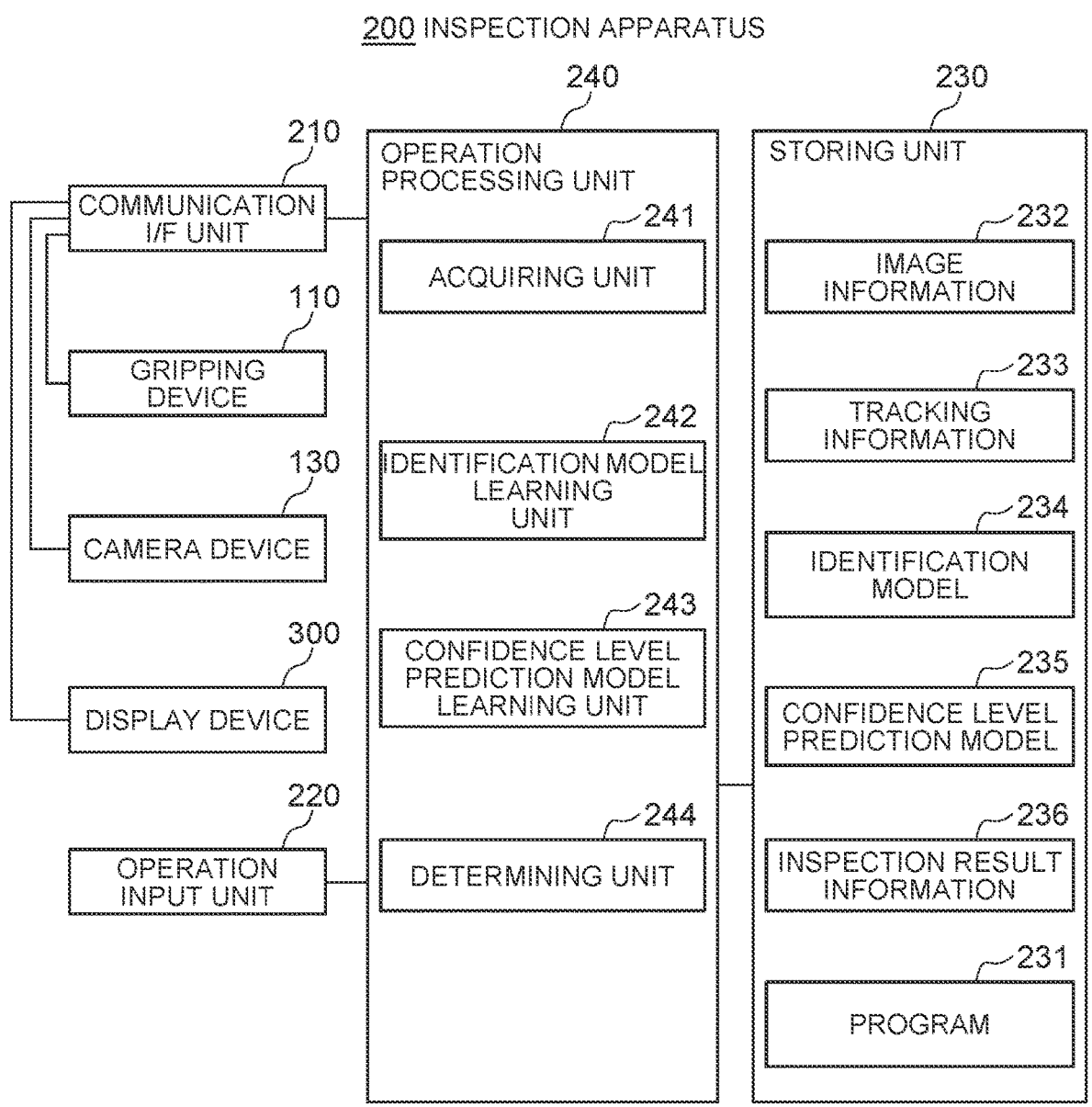
FIG. 2 is a block diagram showing an example of the inspection system in the first example embodiment of the present invention.

FIG. 2 is a block diagram showing an example of the inspection apparatus 200. Referring to FIG. 2, the inspection apparatus 200 includes a communication I/F unit 210, an operation input unit 220, a storing unit 230, and an operation processing unit 240.

The communication I/F unit 210 is composed of a data communication circuit, and is configured to perform data communication with the gripping device 110, the camera device 130, the display device 300, and another external device, which is not shown, using wired or wireless communication. The operation input unit 220 is composed of operation input devices such as a keyboard and a mouse, and is configured to detect an operator's operation and output to the operation processing unit 240.

The storing unit 230 is composed of one or more storage devices of one type or multiple types such as a hard disk and a memory, and is configured to store processing information necessary for a variety of processing by the operation processing unit 240 and a program 231. The program 231 is a program loaded and executed by the operation processing unit 240 to realize various processing units, and is previously loaded from an external device or a recording medium, which are not shown, via a data input/output function such as the communication I/F unit 210, and stored into the storing unit 230. Major processing information stored in the storing unit 230 include image information 232, tracking information 233, an identification model 234, a confidence level prediction model 235, and inspection result information 236.

The image information 232 includes time-series images obtained by consecutively imaging the liquid in the container 400 with the camera device 130. When a floating object is present in the liquid in the container 400, the image information 232 shows the image of the floating object.

Figure 3:
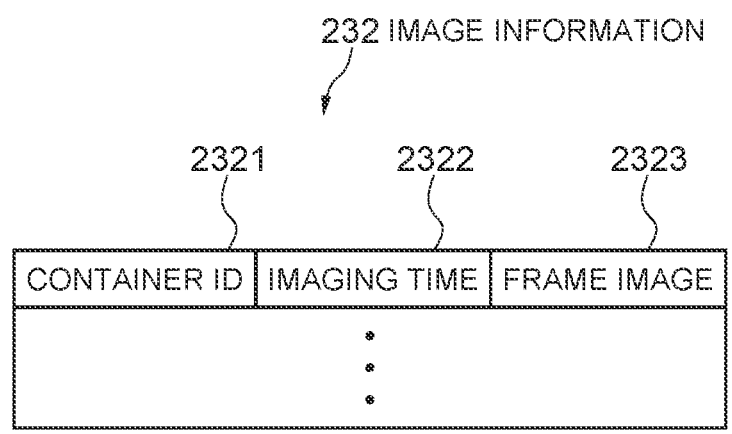
FIG. 3 is a view showing an example of a configuration of image information in the first example embodiment of the present invention.

FIG. 3 shows an example of a configuration of the image information 232. The image information 232 in this example is composed of an entry including a set of a container ID 2321, imaging time 2322, and a frame image 2323. An ID for uniquely identifying the inspection target container 400 is set in the field of the container ID 2321. As the container ID 2321, a serial number assigned to the container 400, a barcode affixed to the container 400, object fingerprint information collected from the cap 401 of the container 400, and the like can be considered. The time of imaging and a frame image are set in the fields of the imaging time 2322 and the frame image 2323, respectively. The imaging time 2322 is set to an accuracy that makes it possible to distinguish and identify from another frame image with the same container ID (for example, in milliseconds). As the imaging time 2322, for example, an elapsed time from a point of time when the tilt, swing or rotation of the container 400 is stopped may be used. In the example shown in FIG. 3, the container ID 2321 is associated with each frame image 2323, but the container ID 2321 may be associated with each group of a plurality of frame images 2323.

Figure 4:
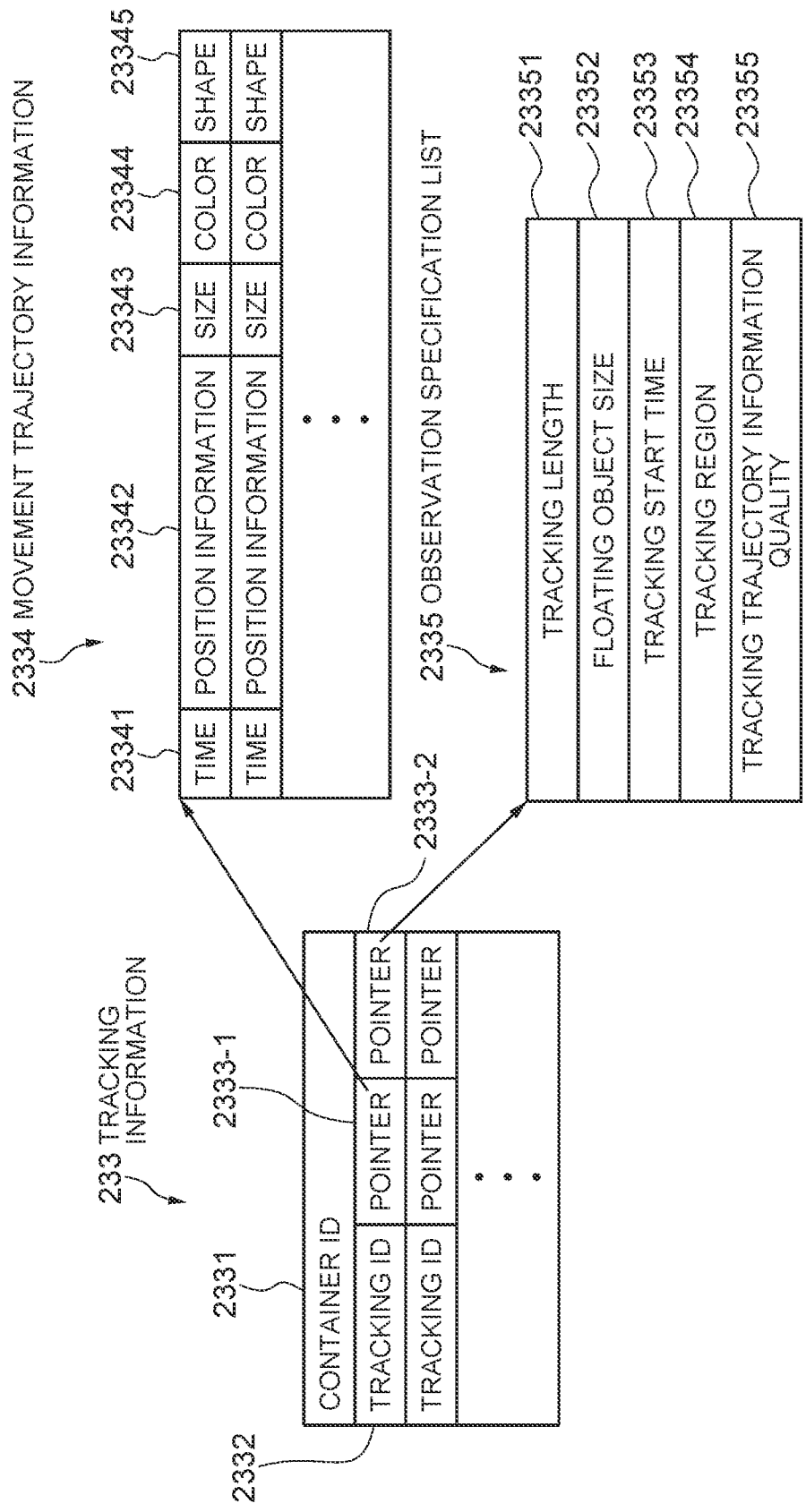
FIG. 4 is a view showing an example of a configuration of tracking information in the first example embodiment of the present invention.

The tracking information 233 includes time-series data representing the movement trajectory of a floating object obtained by detecting and tracking the image of the floating object present in the liquid in the container 400 shown in the image information 232, and the observation specification thereof. For example, the observation specification refers to one information or two or more information defined in advance, such as the length of the observed movement trajectory, the size of the observed floating object, the starting time of the observed movement trajectory, the location in the container 400 where the observed movement trajectory was present, the quality of the movement trajectory, and the like. FIG. 4 shows an example of a configuration of the tracking information 233. The tracking information 233 in this example is composed of an entry of a container ID 2331 and an entry of a set of a tracking ID 2332, a pointer 2333-1 and a pointer 2333-2. An ID for uniquely identifying the container 400 is set in the entry of the container ID 2331. The entry of the set of the tracking ID 2332, the pointer 2333-1 and the pointer 2333-2 is provided for each tracking target floating object. An ID for identifying the tracking target floating object from another floating object in the same container 400 is set in the field of the tracking ID 2332. A pointer to movement trajectory information 2334 of the tracking target floating object is set in the field of the pointer 2333-1. A pointer to an observation specification list 2335 of the movement trajectory information of the tracking target floating object is set in the field of the pointer 2333-2.

The movement trajectory information 2334 is composed of an entry including a set of time 23341, position information 23342, size 23343, color 23344, and shape 23345. The time of imaging, a coordinate value indicating the position of the tracking target floating object at the time of imaging, the size of the floating object, the color of the floating object, and the shape of the floating object are set in the fields of the time 23341, the position information 23342, the size 23343, the color 23344, and the shape 23345. As the time of imaging set in the time 23341, the imaging time 2322 of the frame image is used. The coordinate value may be, for example, a coordinate value in a predetermined coordinate system. The predetermined coordinate system may be a camera coordinate system viewed with the camera at the center, or may be a world coordinate system with a certain position in space as the center. The entries of the movement trajectory information 2334 are arranged in order of the time 23341. The time 23341 of the top entry is tracking start time. The time 23341 of the bottom entry is tracking end time. The time 23341 of entries other than the top and bottom entries are tracking intermediate time.

The observation specification list 2335 is the list of observation specifications that are considered to be related to the confidence level of the type of the floating object estimated from the movement trajectory information 2334. The observation specification list 2335 in this example is composed of an entry including a set of a tracking length 23351, a floating object size 23352, a tracking start time 23353, a tracking region 23354, and a movement trajectory information quality 23355 that are relating to the movement trajectory information 2334.

In the field of the tracking length 23351, the length of the movement trajectory represented by the movement trajectory information 2334. The length of the movement trajectory may be the number of entries composing the movement trajectory information 2334 (namely, the number of frame images), or may be a time length from the tracking start time to the tracking end time. It is considered that the longer the movement trajectory of a floating object is observed, the higher a probability that movement corresponding to the type of the floating object appears in the movement trajectory. In contrast, it is considered that the shorter the movement trajectory of a floating object is observed, the lower a probability that movement corresponding to the type of the floating object appears in the movement trajectory. Therefore, the tracking length 23351 can be one of the observation specifications related to the confidence level of the floating object type estimated from the movement trajectory.

In the field of the floating object size 23352, a value (for example, mean value, maximum value, minimum value, median value) obtained by statistically processing the size 23343 included by the movement trajectory information 2334 is set. A foreign object with a large size tends to settle early after the tilt, swing, or rotation of the container 400 is stopped. Therefore, the floating object size 23352 can be one of the observation specifications related to the confidence level of the floating object type estimated from the movement trajectory.

In the field of the tracking start time 23353, the tracking start time of the movement trajectory information 2334 is set. The tracking start time is, in other words, a value representing the length of an elapsed time from the point of time when the tilt, swing, or rotation of the container 400 is stopped to the point of time of tracking start of the movement trajectory information 2334. As the tracking start time 23353 is earlier, susceptibility to the flow of the liquid is higher, and therefore, it is considered that it takes time for movement corresponding to the floating object type to appear in the movement trajectory. On the other hand, as the tracking start time 23353 is later, susceptibility to the flow of the liquid is lower, and therefore, it is considered that a probability that movement corresponding to the floating object type appears in the movement trajectory increases. Thus, the tracking start time 23353 can be one of the observation specifications related to the confidence level of the floating object type estimated from the movement trajectory.

In the field of the tracking region 23354, a value representing which region within the container 400 the movement trajectory represented by the movement trajectory information 2334 is in is set. The tracking region is also referred to as an observation location. The tracking region 23354 may be, for example, a value that specifies the bounding rectangle of the movement trajectory (for example, the coordinate values of the vertices of the bounding rectangle), or may be a value representing the shortest distance from the bounding rectangle to the liquid level, wall surface, bottom surface of the container 400. It is difficult to correctly detect a foreign object near the liquid level of the container 400 due to the influence of an air bubble floating on the liquid level. Moreover, it is not easy to correctly detect a floating object near the wall surface of the container 400 due to the lens effect. It is also difficult to correctly detect a floating object near the bottom surface of the container 400 due to the influence of shadow and the like. Therefore, which region within the container 400 a movement trajectory is in affects the reliability of the movement trajectory and thus the confidence level of the floating object type estimated from the movement trajectory.

In the field of the movement trajectory information quality 23355, the quality of the movement trajectory information 2334 is set. The quality of the movement trajectory information 2334 may be determined, for example, based on the discontinuity of the position information 23342 included by the movement trajectory information 2334, and the amount of variation of the size 23343, color 23344, shape 23345. For example, the movement trajectory information 2334 containing an excessively large variation and the discontinuity of positions from which uncertainty of the results of detecting and tracking is anticipated has little reliability as a movement trajectory resulting from tracking the same floating object. Therefore, the movement trajectory information quality 23355 can be one of the observation specifications related to the confidence level of the floating object type estimated from the movement trajectory.

Meanwhile, the observation specifications used in the present invention are not limited to the above. Any other observation specification may be used as long as it is related to the confidence level of the floating object type estimated from the movement trajectory, such as a condition that is not directly included in the feature value of the identification model but makes it difficult for the feature value to be evaluated correctly, and a condition that can increase an exceptional error due to a failure in the observation and the like. Moreover, the observation specifications to be used may be determined from the characteristics of the observation (for example, a condition under which a precondition assumed in the detecting/tracking process is broken), or a condition estimated from an actual error (for example, a condition under which the basis for identification cannot be clearly understand).

The identification model 234 is a model that estimates the type of a floating object from time-series data representing the movement trajectory of the floating object. The identification model 234 may be configured, for example, using a recursive structure of a neural network such as RNN or LSTM. Alternatively, the identification model 234 may result in the identification of fixed-length data using padding, pooling processing or resizing.

The confidence level prediction model 235 is a model that predicts, from the observation specifications of time-series data representing the movement trajectory of a floating object, the confidence level of a result estimated by the identification model 234 based on the time-series data relating to the observation specifications. For example, the confidence level prediction model 235 may be configured using a neural network. Alternatively, the confidence level prediction model 235 may be a linear discriminator, a decision tree, or the like.

The inspection result information 236 includes information corresponding to the result of inspection whether or not a foreign object is present in the liquid encapsulated in the container 400. The inspection result includes the result of estimation of a floating object type calculated by the identification model 234 and the confidence level of the result of estimation by the identification model 234 calculated by the confidence level prediction model 235.

Figure 5:
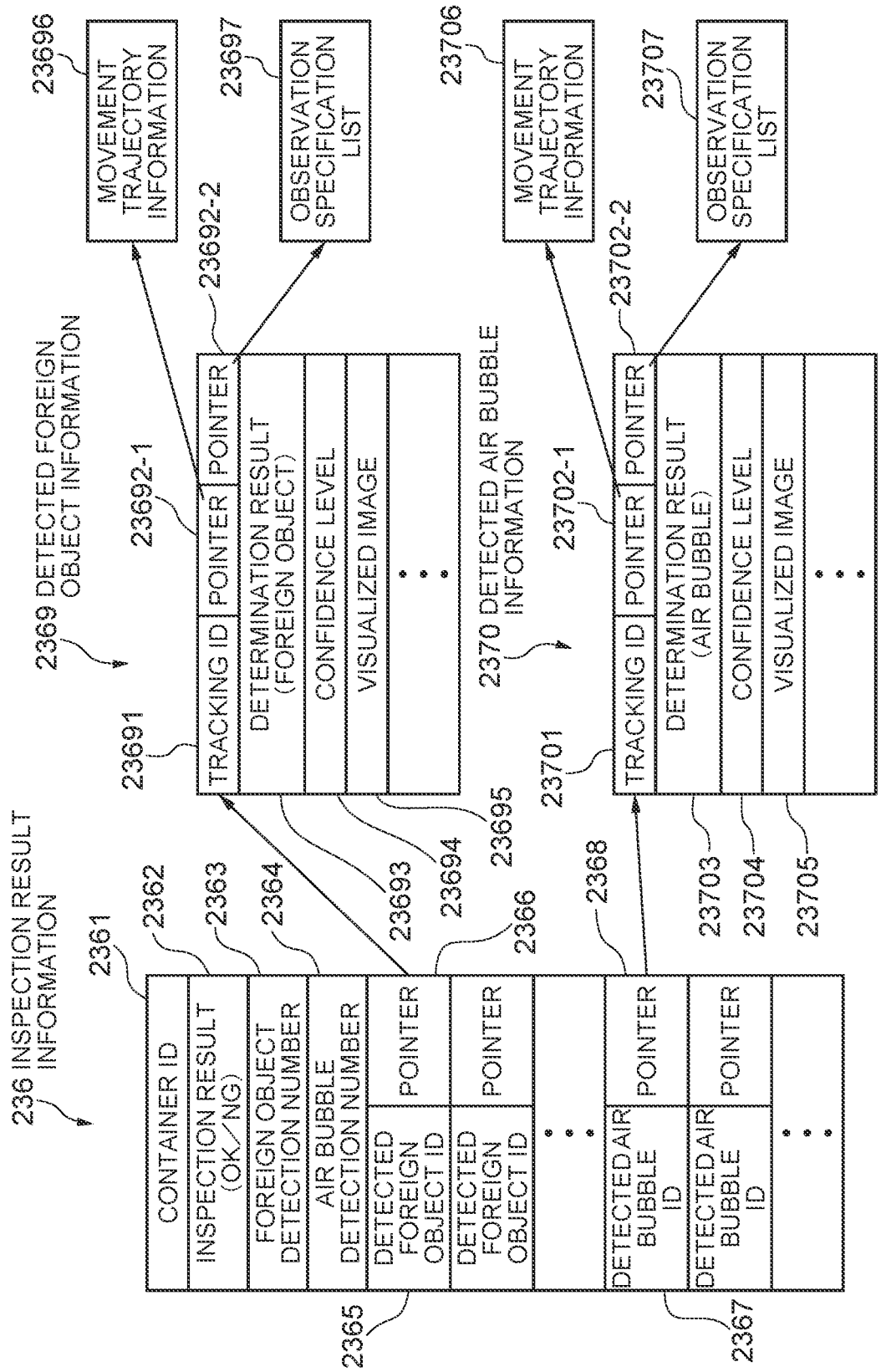
FIG. 5 is a view showing an example of a configuration of inspection result information in the first example embodiment of the present invention.

FIG. 5 shows an example of a configuration of the inspection result information 236. The inspection result information 236 in this example is composed of an entry of a container ID 2361, an entry of an inspection result 2362, an entry of a foreign object detection number 2363, an entry of an air bubble detection number 2364, an entry of a set of a detected foreign object ID 2365 and a pointer 2366, and an entry of a set of a detected air bubble ID 2367 and a pointer 2368. In the entry of the container ID 2361, an ID for uniquely identifying the inspection target container 400 is set. In the entry of the inspection result 2362, an inspection result of either OK (inspection passed) or NG (inspection failed) is set. In the entry of the foreign object detection number 2363, the total number of detected foreign objects is set. In the entry of the air bubble detection number 2364, the total number of detected air bubbles is set. As the identification result, an agglomerate of constituents in the liquid may be included in addition to an air bubble and a foreign object.

The entry of the set of the detected foreign object ID 2365 and the pointer 2366 is set for each detected foreign object. In the field of the detected foreign object ID 2365, an ID for identifying the detected foreign object from another foreign object in the same container 400 is set. In the field of the pointer 2366, a pointer to detected foreign object information 2369 of the detected foreign object is set.

The entry of the set of the detected air bubble ID 2367 and the pointer 2368 is set for each detected air bubble. In the field of the detected air bubble ID 2367, an ID for identifying the detected air bubble from another air bubble in the same container 400 is set. In the field of the pointer 2368, a pointer to detected air bubble information 2370 of the detected air bubble is set.

The detected foreign object information 2369 is composed of an entry of a set of a tracking ID 23691, a pointer 23692-1 and a pointer 23692-2, an entry of a determination result 23693, an entry of a confidence level 23694, and an entry of a visualized image 23695. In the field of the tracking ID 23691, the tracking ID 2332 of the detected foreign object is set. In the field of the pointer 23692-1, a pointer to movement trajectory information 23696 of the detected foreign object is set. The movement trajectory information 23696 is a copy of the movement trajectory information 2334 in tracking of the detected foreign object. In the field of the pointer 23692-2, a pointer to an observation specification list 23697 relating to the movement trajectory information 23696 of the detected foreign object is set. The observation specification list 23697 is a copy of the observation specification list 2335 relating to the movement tracking information 2334 in tracking of the detected foreign object. In the entry of the determination result 23693, a text indicating that the determination result is "foreign matter" is set. In the entry of the confidence level 23694, a confidence level that is an index representing the certainty of the determination result 23693 is set. In the entry of the visualized image 23695, at least one image obtained by visualizing the movement trajectory information 23696 of the detected foreign object is set.

The detected air bubble information 2370 is composed of an entry of a set of a tracking ID 23701, a pointer 23702-1 and a pointer 23702-2, an entry of a determination result 23703, an entry of a confidence level 23704, and an entry of a visualized image 23705. In the field of the tracking ID 23701, the tracking ID 2332 of the detected air bubble is set. In the field of the pointer 23702-1, a pointer to movement trajectory information 23706 of the detected air bubble is set. The movement trajectory information 23706 is a copy of the movement trajectory information 2334 in tracking of the detected air bubble. In the field of the pointer 23702-2, a pointer to an observation specification list 23707 relating to the movement trajectory information 23706 of the detected air bubble is set. The observation specification list 23707 is a copy of the observation specification list 2335 relating to the movement tracking information 2334 of the tracking information of the detected air bubble. In the entry of the determination result 23703, a text indicating that the determination result is "air bubble" is set. In the entry of the confidence level 23704, a confidence level that is an index representing the certainty of the determination result 23703 is set. In the entry of the visualized image 23705, at least one image obtained by visualizing the movement trajectory information 23706 of the detected air bubble is set.

Referring to FIG. 2 again, the operation processing unit 240 has a microprocessor such as an MPU and a peripheral circuit thereof, and is configured to implement various processing units by loading the program 231 from the storing unit 230 and executing the program 231 to make the above hardware and the program 231 cooperate. Major processing units implemented by the operation processing unit 240 include an acquiring unit 241, an identification model learning unit 242, a confidence level prediction model learning unit 243, and a determining unit 244.

The acquiring unit 241 is configured to control the gripping device 110 and the camera device 130 and acquire the image information 232 showing the image of a floating object present in the liquid encapsulated in the container 400. The acquiring unit 241 is also configured to analyze the image information 232 and thereby acquire the tracking information 233 including time-series data representing the movement trajectory of the floating object and the observation specification thereof. In the following, the details of the acquiring unit 241 will be described.

The acquiring unit 241 first activates the gripping device 110 gripping the inspection target container 400 in the upright posture, and thereby tilts, swings, or rotates the inspection target container 400. Next, when a predetermined time elapses after the activation, the acquiring unit 241 stops the gripping device 110, and thereby makes the container 400 stationary in a predetermined posture. By thus making the container 400 stationary after tilting, swinging, or rotating for a predetermined time, a state in which the liquid flows by inertia in the stationary container 400 can be obtained. Next, the acquiring unit 241 starts the operation to consecutively image the liquid in the inspection target container 400 with the camera device 130 at a predetermined frame rate under transmitted illumination by the lighting device 120. That is to say, the acquiring unit 241 starts the abovementioned imaging operation from time Ts, where the time Ts is the time when the container 400 is made to be stationary after being tilted, swung, or rotated.

Further, the acquiring unit 241 keeps consecutively imaging the liquid in the container 400 with the camera device 130 from the time Ts to time Te when a predetermined time Tw elapses. For example, assuming all floating objects that are floating in the liquid are air bubbles, the predetermined time Tw may be set to be equal to or more than a time required for obtaining a moving trajectory such that all the air bubbles move upward in the container 400 and are no longer expected to move downward (hereinafter referred to as a minimum imaging time length). The minimum imaging time length may be determined in advance by an experiment or the like and fixedly set in the acquiring unit 241. When the time Te is reached, the acquiring unit 241 may immediately stop imaging with the camera device 130, or may still continue imaging with the camera device 130.

The acquiring unit 241 assigns the imaging time and the container ID to each of the time-series frame images acquired from the camera device 130, and stores as the image information 232 into the storing unit 230.

Next, when time-series frame images for a predetermined time length are acquired, the acquiring unit 241 detects the shadow of a floating object in the liquid in the container 400 from each of the frame images. For example, the acquiring unit 241 detects the shadow of the floating object in the liquid by a method as described below. However, the acquiring unit 241 may detect the shadow of the floating object in the liquid by a method other than the one described below.

First, the acquiring unit 241 binarizes the respective frame images to create binarized frame images. Next, the acquiring unit 241 detects the shadow of a floating object from each of the binarized frame images in the following manner.

First, the acquiring unit 241 sets a binarized frame image from which the shadow of a floating object is to be detected as an attended binarized frame image. Next, the acquiring unit 241 generates a difference image between the attended binarized frame image and a binarized frame image whose imaging time is At later. Here, At is set to a time such that the same floating object appears in the two images at partially overlapping positions or at positions that are very close to each other but not overlap. Therefore, the time difference At is defined in accordance with the natures, flow states and the like of a liquid and a foreign object. In the abovementioned difference image, image portions that coincide in the two binarized frame images are deleted, and only different image portions are left. Consequently, the outline, scratch and so forth of the container 400 appearing at the same positions in the two binarized frame images are deleted, and only the shadow of a floating object appears. The acquiring unit 241 detects the shadow of the attended binarized frame image, which corresponds to a part where the shadow appears in the difference image, as the shadow of a floating object present in the attended binarized frame image.

The acquiring unit 241 tracks the detected floating object in the time-series images and creates the tracking information 233 in accordance with the result of the tracking. First, the acquiring unit 241 initializes the tracking information 233. In this initialization, the container ID of the inspection target container 400 is set in the entry of the container ID 2331 in FIG. 4. Next, the acquiring unit 241 tracks the floating object in the time-series images by a method as described below and, in accordance with the tracking result, creates for each floating object an entry of a set of the tracking ID 2332, the pointer 2333-1 and the pointer 233-2, the movement trajectory information 2334, and the observation specification list 2335 shown in FIG. 4.

First, the acquiring unit 241 attends a binarized frame image with the earliest imaging time in the time series of the created binarized frame images. Next, the acquiring unit 241 assigns a unique tracking ID to each floating object detected in the attended binarized frame image. Next, for each detected floating object, the acquiring unit 241 sets the tracking ID assigned to the floating object detected in the attended binarized frame image in the field of the tracking ID 2332 shown in FIG. 4, sets the imaging time of the attended binarized frame image in the field of the time 23341 of the top entry of the movement trajectory information 2334 directed by the corresponding pointer 2333-1, and sets the coordinate value, size, color, and shape of the floating object in the attended binarized frame image in the fields of the position information 23342, the size 23343, the color 23344, and the shape 23345.

Next, the acquiring unit 241 shifts attention to a binarized frame image one frame after the attended binarized frame image. Next, the acquiring unit 241 attends one of the floating objects detected in the attended binarized frame image. Next, the acquiring unit 241 compares the position of the attended floating object with the position of the floating object detected in the binarized frame image one frame therebefore (hereinafter referred to as a preceding binarized frame image) and, when the floating object is present within a predetermined threshold distance from the attended floating object, determines that the attended floating object and the floating object present within the threshold distance are the same floating objects. In this case, the acquiring unit 241 assigns the tracking ID assigned to the floating object determined to be the same floating object to the attended floating object. Then, the acquiring unit 241 secures a new entry in the movement trajectory information 2334 directed by the pointer 2333-1 of the entry of the tracking information 233 for which the assigned tracking ID 2332 is set, and sets the imaging time of the attended binarized frame image and the coordinate value, size, color and shape of the attended floating object in the time 23341, the position information 23342, the size 23343, the color 23344 and the shape 23345 of the secured entry.

On the other hand, in a case where a floating object is not present within the threshold distance from the attended floating object in the preceding binarized frame image, the acquiring unit 241 determines that the attended floating object is a new floating object, and assigns a new tracking ID thereto. Next, the acquiring unit 241 sets the tracking ID assigned to the attended floating object in the field of the tracking ID 2332 shown in FIG. 4 of the newly secured entry, sets the imaging time of the attended binarized frame image in the field of the time 23341 of the top entry of the movement trajectory information 2334 directed by the corresponding pointer 2333-1, and sets the coordinate value, size, color and shape of the attended floating object in the fields of the position information 23342, the size 23343, the color 23344 and the shape 23345.

When finishing the processing on the attended floating object, the acquiring unit 241 shifts attention to a next floating object detected in the attended binarized frame image, and repeatedly executes the same processing as the abovementioned processing. Then, when the acquiring unit 241 finishes attending all the floating objects detected in the attended binarized frame image, the acquiring unit 241 shifts attention to a frame image one frame thereafter, and repeatedly executes the same processing as the abovementioned processing. Then, when the acquiring unit 241 finishes attending the last frame image in the image information 232, the acquiring unit 241 ends the tracking process.

In the above description, the acquiring unit 241 performs the tracking based on the distance between floating objects in two frame images adjacent to each other. However, the acquiring unit 241 may perform the tracking based on the distance between floating objects in two frame images that are adjacent to each other across n frame (n is a positive integer of 1 or more). The acquiring unit 241 may also perform the tracking by comprehensively determining a tracking result obtained by tracking based on the distance between floating objects in two frame images that are adjacent to each other across m frame (m is a positive integer of 0 or more) and a tracking result obtained by tracking based on the distance between floating objects in two frame images that are adjacent to each other across m+j frames (j is a positive integer of 1 or more).

When the acquiring unit 241 finishes the tracking process, the acquiring unit 241 creates the observation specification list 2335 for each movement trajectory information 2334 created in the abovementioned manner. First, the acquiring unit 241 creates the observation specification list 2335 in the initial state relating to the attended movement trajectory information 2334 in a region directed by a pointer set in the pointer 2333-2. Next, the acquiring unit 241 sets the length of the movement trajectory represented by the attended movement trajectory information 2334 in the field of the tracking length 23351. Next, the acquiring unit 241 sets a value obtained by statistically processing the size 23345 included by the attended movement trajectory information 2334, in the field of the floating object size 23352. Next, the acquiring unit 241 sets the tracking start time of the attended movement trajectory information 2334, in the field of the tracking start time 23353. Next, the acquiring unit 241 sets a value representing in which region within the container 400 the movement trajectory represented by the attended movement trajectory information 2334 is, in the field of the tracking region 23354. Next, the acquiring unit 241 sets a numerical value indicating the quality of the attended movement trajectory information 2334, in the field of the quality 23355 of the movement trajectory information. When the acquiring unit 241 finishes creating the observation specification list 2335 relating to the attended movement trajectory information, the acquiring unit 241 shifts attention to one of the remaining movement trajectory information 2334, and repeatedly executes the same processing as described above. The acquiring unit 241 repeatedly executes this processing until finishing attending all the movement trajectory information 2334.

The identification model learning unit 242 is configured to generate the identification model 234 by machine learning.

The identification model learning unit 242 uses time-series data representing the movement trajectory of a floating object and the type of the floating object as training data (hereinafter referred to as first training data). As time-series data representing the movement trajectory of a floating object, for example, the movement trajectory information 2334 shown in FIG. 4 may be used. Alternatively, time-series data representing the movement trajectory of a floating object may be, for example, the remaining information obtained by removing one or two or all of the size 23343, the color 23344, and the shape 23345 from the movement trajectory information 2334 shown in FIG. 4. Moreover, the type of a floating object may be a label value representing either a foreign object or an air bubble. Thus, the first training data includes time-series data representing the movement trajectory of a floating object and a label representing the type of the floating object. Such first training data can be created, for example, by interactive processing with the user. For example, the identification model learning unit 242 displays the movement trajectory information 2334 acquired by the acquiring unit 241 on the screen of the display device 300, and accepts the label of the movement trajectory information 2334 from the user through the operation input unit 220. Then, the identification model learning unit 242 creates a set of the displayed movement trajectory information 2334 and the accepted label as one first training data. However, the method for creating the first training data is not limited to the above.

The identification model learning unit 242 is configured to use the first training data as described above and generate, by machine learning, the identification model 234 with time-series data representing the movement trajectory of a floating object (foreign object or air bubble) as an input and with the type of the floating object as an output.

The confidence level prediction model learning unit 243 is configured to generate the confidence level prediction model 235 by machine learning.

Figure 6:
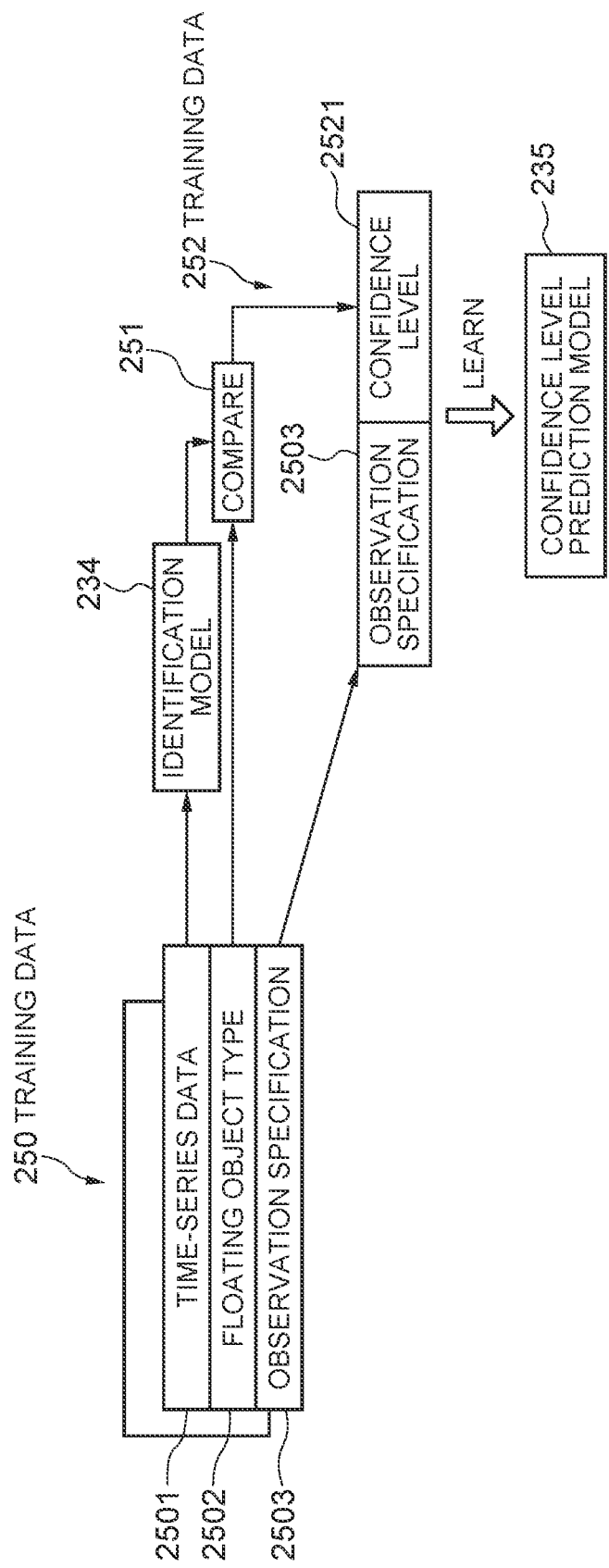
FIG. 6 is a schematic diagram showing an example of a method for creating training data used in machine learning of a confidence level prediction model in the first example embodiment of the present invention.

FIG. 6 is a schematic diagram showing an example of a method for creating training data used for machine learning of the confidence level prediction model 235. In FIG. 6, each training data 250 includes time-series data 2501 representing the movement trajectory of a floating object, a floating object type 2502 thereof, and an observation specification 2503 thereof. As the time-series data 2501, for example, the movement trajectory information 2334 shown in FIG. 4 may be used. Alternatively, the time-series data 2501 may be, for example, the remaining information obtained by removing one or two or all of the size 23343, the color 23344 and the shape 23345 from the movement trajectory information 2334 shown in FIG. 4. Moreover, as the observation specification 2503, the observation specification list 2335 of the movement trajectory information 2334 shown in FIG. 4 may be used. Moreover, the floating object type 2502 may be a label value representing either a foreign object or an air bubble. Such a label value can be created, for example, by interactive processing with the user. For example, the confidence level prediction model learning unit 243 displays the movement trajectory information 2334 acquired by the acquiring unit 241 on the screen of the display device 300, and accepts the label of the movement trajectory information 2334 from the user through the operation input unit 220. Then, the confidence level prediction model learning unit 243 creates a set of the displayed movement trajectory information 2334, the accepted label, and the observation specification list 2335 of the movement trajectory information 2334, as one training data. However, the method for creating the training data is not limited to the above.

Further, the confidence level prediction model learning unit 243 creates one new training data 252 from one training data 250 in the following manner. First, the confidence level prediction model learning unit 243 inputs the time-series data 2501 included by the training data 250 into the learned identification model 234, and acquires the result of estimation of a floating object type finally output from the identification model 234. Next, the confidence level prediction model learning unit 243 compares the floating object type indicated by the result of estimation by the identification model 234 with the floating object type included by the training data 250 (Block 251). Next, the confidence level prediction model learning unit 243 creates a set of a confidence level 2521 set to a value corresponding to the comparison result and the observation specification 2503 included by the training data 250, as the training data 252.

In a case where the both match (that is, a case where the result of estimation by the identification model 234 is correct), the abovementioned value corresponding to the comparison result may be a large value (for example, 1 or a value close to 1). As this value, a predetermined fixed value (for example, 1) may be used, or the softmax value of the true class of the identification model 234 (TCP) may be used. On the other hand, in a case where the both do not match (that is, the result of estimation by the identification model 234 is wrong), the abovementioned value may be a small value (for example, 0 or a value close to 0). As this value, a predetermined fixed value (for example, 0) may be used, or the softmax value of the true class of the identification model 234 (TCP) may be used.

The confidence level prediction model learning unit 243 is configured to use the training data 252 created in the abovementioned manner and generate, by machine learning, the confidence level prediction model 235 with the observation specification of time-series data representing the movement trajectory of a floating object obtained by observation as an input and with the confidence level of an estimation result by the identification model 234 estimated from the time-series data relating to the observation specification as an output.

The determining unit 244 is configured to use the learned identification model 234 and estimate the type of a floating object from the time-series data representing the movement trajectory of a floating object in the liquid encapsulated in the container 400 acquired by the acquiring unit 241. The determining unit 244 is also configured to use the learned confidence level prediction model 235 and predict the confidence level of an estimation result by the identification model 234 from the observation specification acquired by the acquiring unit 241. The determining unit 244 is also configured to create the inspection result information 236 that includes the floating object type estimated using the identification model 234 and the confidence level of the estimation result by the identification model 234 predicted using the confidence level prediction model 235.

For example, by retrieving the tracking information 233 from the storing unit 230 and inputting, for each tracking ID included by the tracking information 233, the movement trajectory information 2334 representing the movement trajectory of a floating object as time-series data into the learned identification model 234, the determining unit 244 determines whether the floating object with the tracking ID is a foreign object or an air bubble. Moreover, by inputting, for each tracking ID included by the tracking information 233, the observation specification list 2335 of the movement trajectory of a floating object into the learned confidence level prediction model 235, the determining unit 244 predicts the confidence level of a determination result of the floating object type determined using the identification model 234. Then, the determining unit 244 creates the inspection result information 236 corresponding to the determination result and stores into the storing unit 230. Moreover, the determining unit 244 displays the inspection result information 236 on the display device 300, or/and transmits to an external device through the communication I/F unit 210.

Next, the operation of the inspection system 100 according to this example embodiment will be described. The phases of the inspection system 100 are roughly separated into a learning phase and an inspection phase. The learning phase is a phase to create the identification model 234 and the confidence level prediction model 235 by machine learning. The inspection phase is a phase to inspect whether a foreign object is present in a liquid encapsulated in the container 400 by using the learned identification model 234 and the learned confidence level prediction model 235.

Figure 7:
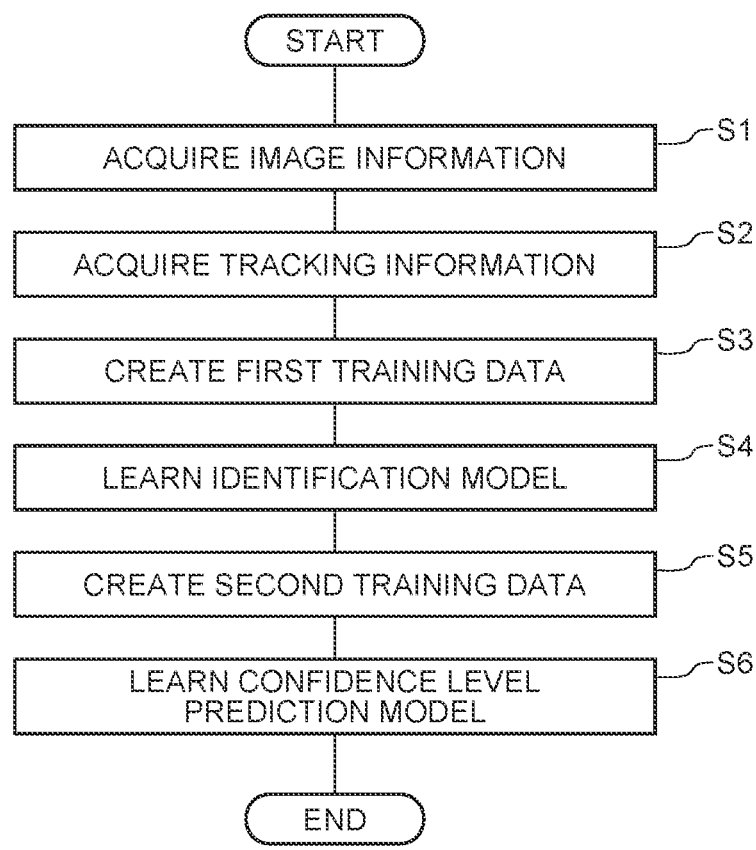
FIG. 7 is a flowchart showing an example of operation of a learning phase in the first example embodiment of the present invention.

FIG. 7 is a flowchart showing an example of the operation in the learning phase. Referring to FIG. 7, first, the acquiring unit 241 controls the gripping device 110 and the camera device 130 to acquire the image information 232 showing the image of a floating object present in a liquid encapsulated in the container 400 (step S1). Next, the acquiring unit 241 analyzes the image information 232 to acquire the tracking information 233 including time-series data representing the movement trajectory of the floating object and an observation specification thereof (step S2).

Next, the identification model learning unit 242 creates first training data to be used for machine learning of the identification model 234 (step S3). Next, the identification model learning unit 242 uses the created first training data to generate, by machine learning, the identification model 234 with the time-series data representing the moving trajectory of the floating object as an input and with the type of the floating object as an output (step S4).

Next, the confidence level prediction model learning unit 243 creates second training data to be used for machine learning of the confidence level prediction model 235 (step S5). Next, the confidence level prediction model learning unit 243 uses the created second training data to generate, by machine learning, the confidence level prediction model 235 with the observation specification of time-series data representing the movement trajectory of a floating object obtained by observation as an input and with the confidence level of an estimation result by the identification model 234 estimated from the time-series data relating to the observation specification as an output (step S6).

Figure 8:
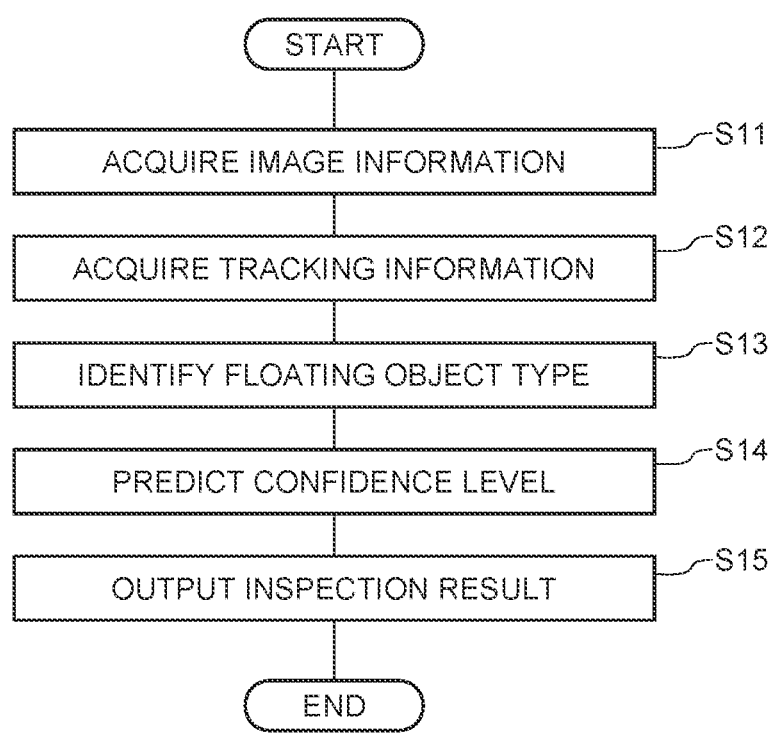
FIG. 8 is a flowchart showing an example of operation of an inspection phase in the first example embodiment of the present invention.

FIG. 8 is a flowchart showing an example of the operation in the inspection phase. Referring to FIG. 8, first, the acquiring unit 241 controls the gripping device 110 and the camera device 130 to acquire the image information 232 showing the image of a floating object present in a liquid encapsulated in the container 400 (step S11). Next, the acquiring unit 241 analyzes the image information 232 to acquire the tracking information 233 including time-series data representing the movement trajectory of the floating object and an observation specification thereof (step S12).

Next, the determining unit 244 estimates the type of the floating object from the time-series data representing the movement trajectory of the floating object included by the tracking information 233 by using the learned identification model 234 (step S13). Next, the determining unit 244 predicts the confidence level of the estimation result by the identification model 234 from an observation specification list of the time-series data representing the movement trajectory of the floating object included by the tracking information 233, by using the learned confidence level prediction model 235 (step S14). Next, the determining unit 244 creates the inspection result information 236 based on the estimated type of the floating object and the predicted confidence level of the estimation result (step S15).

As described above, according to this example embodiment, in a case where a plurality of time-series data representing movement trajectories obtained by observation from a plurality of floating objects of different types are similar to each other but the observation specifications thereof are different, it is possible to differentiate the confidence levels of estimation results of the floating object types estimated from the time-series data. The reason is that the confidence level prediction model learning unit 243 acquires source data including a set of time-series data representing the movement trajectory of a floating object, an observation specification thereof, and the type of the floating object that are obtained by the acquiring unit 241, and generates the confidence level prediction model 235 by machine learning by using training data including a set of a confidence level set for a value corresponding to the result of comparison between the target object type estimated from the time-series data in the source data using the learned identification model and the target object type in the source data, and the abovementioned observation source. Also, the reason is that the determining unit 244 acquires an observation specification relating to time-series data representing the movement trajectory of a target object obtained by the acquiring unit 241 and, using the learned confidence level prediction model 235, outputs the confidence level of an estimation result by the identification model 234 estimated from the acquired observation specification.

Subsequently, modified examples of this example embodiment will be described.

Modified Example 1

The determining unit 244 may modify or correct the result of estimation by the identification model 234 based on a confidence level predicted by the confidence level prediction model 235.

For example, in a case where a floating object type estimated from time-series data using the identification model 234 is foreign object, when the confidence level of the above estimation result predicted from the observation specification of the time-series data using the confidence level prediction model 235 is smaller (lower) than a predetermined threshold value, the determining unit 244 may modify the above floating object type to air bubble from foreign object.

Further, for example, in a case where a floating object type estimated from time-series data using the identification model 234 is foreign object, the determining unit 244 may calculate the confidence level of the above estimation result predicted from the observation specification of the time-series data using the confidence level prediction model 235, as a foreign-object likelihood score.

Further, for example, in a case where a floating object type estimated from time-series data using the identification model 234 is foreign object, the determining unit 244 may correct the foreign-object likelihood score by the identification model 234 (the probability of foreign object output by the identification model 234) by using the confidence level of the above estimation result predicted from the observation specification of the time-series data using the confidence level prediction model 235.

Modified Example 2

Figure 9:
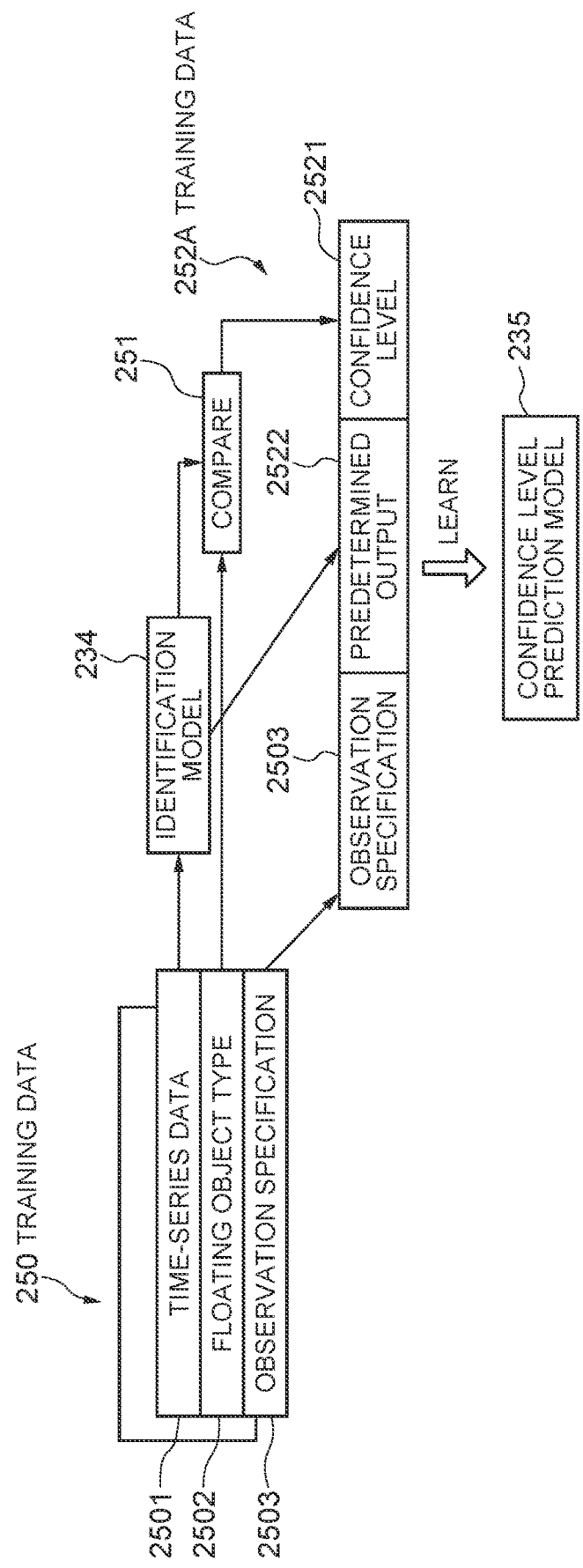
FIG. 9 is a schematic diagram showing another example of the method for creating training data used in machine learning of a confidence level prediction model in the first example embodiment of the present invention.

The confidence level prediction model learning unit 243 may use a predetermined output of the identification model 234 for learning the confidence level prediction model 235. Here, the predetermined output of the identification model 234 may be, for example, a feature value output from the middle layer of the identification model 234. FIG. 9 is a schematic diagram showing another example of the method for creating training data to be used for machine learning of the confidence level prediction model 235. In FIG. 9, the same reference numerals as in FIG. 6 denote the same parts, reference numeral 252A denotes training data, and reference numeral 2522 denotes the predetermined output of the identification model 234. Referring to FIG. 9, the confidence level prediction model learning unit 243 creates one new training data 252A from one training data 250 in the following manner. First, the confidence level prediction model learning unit 243 inputs the time-series data 2501 included by the training data 250 into the learned identification model 234, and acquires the result of identification of a floating object type finally output from the identification model 234 and the predetermined output 2522. Next, in the same manner as in FIG. 6, the confidence level prediction model learning unit 243 creates the confidence level 2521 corresponding to the result of comparison between the floating object type indicated by the estimation result by the identification model 234 and the floating object type included by the training data 250 (Block 251). Then, the confidence level prediction model learning unit 243 creates a set of the confidence level 2521, the observation specification 2503 included by the training data 250 and the predetermined output 2522, as the training data 252A.

The confidence level prediction model learning unit 243 is configured to use the training data 252A created in the above manner to generate, by machine learning, the confidence level prediction model 235 for which an input is a set of the observation specification of time-series data representing the movement trajectory of a floating object obtained by observation and the predetermined output 2522 output from the identification model 234 when the time-series data is input into the identification model 234 and an output is the confidence level of an estimation result by the identification model 234 estimated from the time-series data relating to the observation specification.

Further, the determining unit 244 may use the predetermined output from the identification model 234 for confidence level prediction. For example, the determining unit 244 inputs a set of an observation specification list of time-series data representing the movement trajectory of a floating object included by the tracking information 233 and the predetermined output 2522 output from the identification model 234 when the time-series data is input to the identification model 234 into the learned confidence level prediction model 235, and acquires the confidence level of the estimation result by the identification model 234.

In the above description, the predetermined output by the identification model 234 is a feature value output from the middle layer of the identification model 234. However, the predetermined output by the identification model 234 is not limited to the above. The predetermined output by the identification model 234 may be the final output by the identification model 234.

Modified Example 3

At any point of time after the confidence level prediction model 235 is generated at step S6 in FIG. 7, the identification model learning unit 242 may further learn the identification model 234 generated at step S4. In that case, the identification model learning unit 242 may control learning of the identification model 243 based on a confidence level predicted by the learned confidence level prediction model 235.

Figure 10:
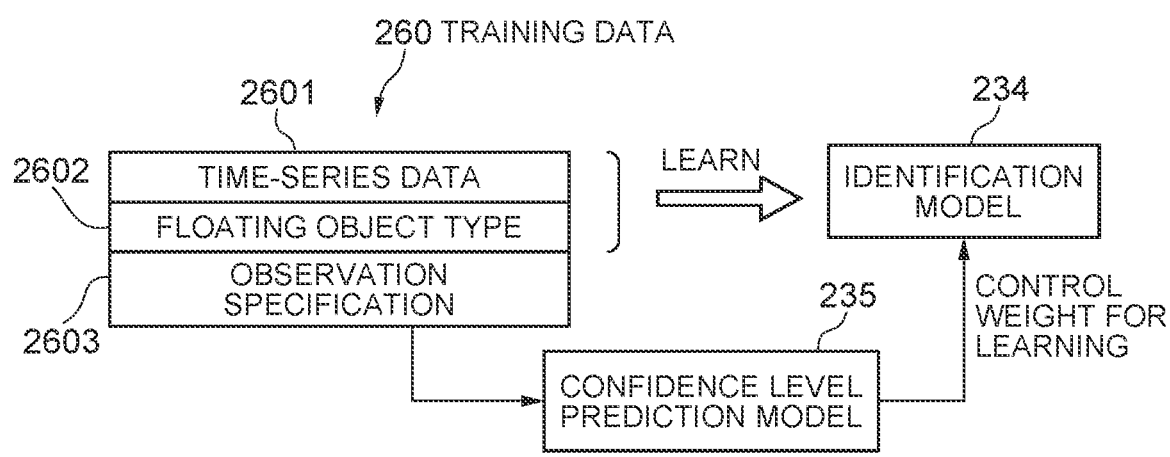
FIG. 10 is a schematic diagram showing an example of a method for learning an identification model in a modified example 3 in the first example embodiment of the present invention.

FIG. 10 is a schematic diagram showing an example of a method for learning the identification model 234 in a modified example 3. In FIG. 10, training data 260 includes time-series data 2601 representing the movement trajectory of a floating object and a floating object type 2602 thereof. Moreover, for each training data 260, an observation specification 2603 of the time-series data 2601 is prepared. When learning the identification model 234 using the training data 260, the identification model learning unit 242 inputs the observation specification 2603 paired with the training data 260 into the learned confidence level prediction model 235, and controls learning of the identification model 234 by a confidence level output from the confidence level prediction model 235. For example, the identification model leaning unit 242 makes a weight of learning smaller as the confidence level is lower. Consequently, it is possible to increase the identification accuracy of the identification model 234.

Modified Example 4

In this modified example, the confidence level prediction model learning unit 243 is configured to divide time-series data representing the movement trajectory of a floating object obtained by observation into several partial time-series data and perform machine learning of the confidence level prediction model 235 using an observation specification of each partial time-series data.

Figure 11:
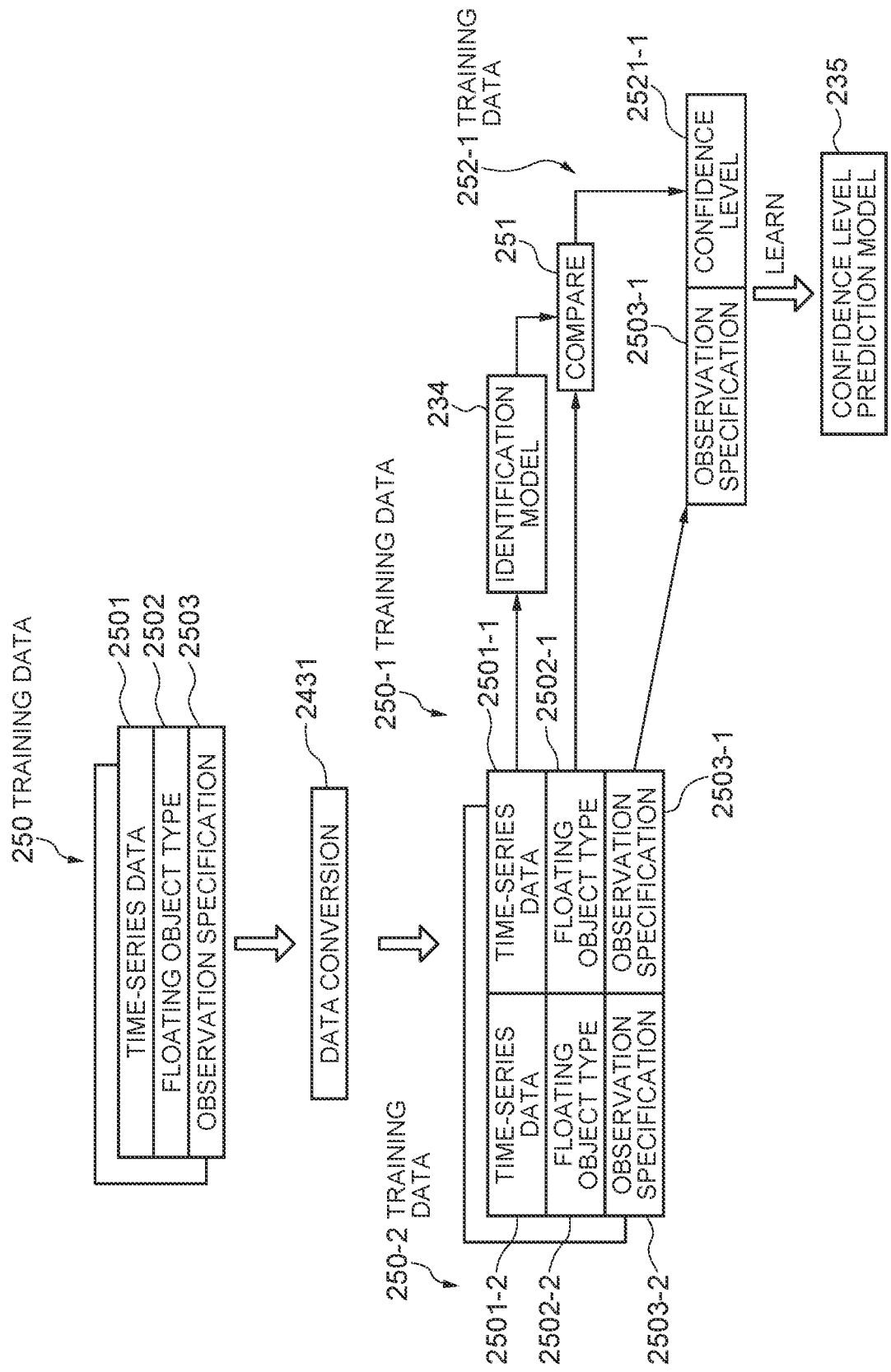
FIG. 11 is a schematic diagram showing an example of a method for creating training data used in machine learning of a confidence level prediction model in a modified example 4 in the first example embodiment of the present invention.

FIG. 11 is a schematic diagram showing an example of a method for creating training data to be used for machine learning of the confidence level prediction model 235 in a modified example 4. In FIG. 11, each training data 250 includes the time-series data 2501, the floating object type 2502, and the observation specification 2503 that have been already described with reference to FIG. 6. The time-series data 2501 can be, for example, the movement trajectory information 2334 shown in FIG. 4. The observation specification 2503 can be, for example, the observation specification list 2335 shown in FIG. 4.

In the modified example 4, the confidence level prediction model learning unit 243 has a data converting unit 2431 that converts each training data 250 to two new training data, namely, training data 250-1 and training data 250-2. The training data 250-1 includes time-series data 2501-1, floating object type 2502-2, and observation specification 2503-1. The training data 250-2 includes time-series data 2501-2, floating object type 2502-2, and observation specification 2503-2. In the example of FIG. 11, one training data 250 is converted to two training data, but may be converted to three or more training data.

The data converting unit 2431 converts the training data 250 to the training data 250-1 and the training data 250-2 by the following method, for example. First, the data converting unit 2431 calculates the intermediate time between the tracking start time and the tracking end time of the time-series data 2501 included by the training data 250. Next, the data converting unit 2431 converts the time-series data 2501 to the time-series data 2501-1 of a section from the tracking start time to the intermediate time and the time-series data 2501-2 from the intermediate time to the tracking end time. Next, the data converting unit 2431 creates the floating object types 2502-1 and 2502-2 having the same contents as the floating object type 2502 of the training data 250. Next, the data converting unit 2431 creates the observation specifications 2503-1 and 2503-2 from the time-series data 2501-1 and 2501-2.

For example, the data converting unit 2431 creates the observation specification 2503-1 from the time-series data 2501-1 by the following method. First, the data converting unit 2431 calculates the number of frame images configuring the time-series data 2501-1, or a time length from the imaging time of the top frame image of the time-series data 2501-1 to the imaging time of the last frame image, and sets it as a tracking length of the time-series data 2501-1. Next, the data converting unit 2431 calculates a value obtained by statistically processing the size 23343 included by the time-series data 2501-1 (for example, mean value, maximum value, minimum value, median value), and sets the value as a floating object size. Next, the data converting unit 2431 acquires the imaging time of the top frame image of the time-series data 2501-1, and sets the imaging time as the tracking start time. Next, the data converting unit 2431 calculates a value specifying the bounding rectangle of the movement trajectory represented by the time-series data 2501-1 (for example, the coordinate values of vertices of the bounding rectangle), and sets the value as a tracking region. Next, the data converting unit 2431 calculates the quality of movement trajectory information based on the discontinuity of the position information 23342 included by the time-series data 2501-1 and the amounts of variation in size 23343, color 23344 and shape 23345. Then, the data converting unit 2431 creates the observation specification 2503-1 composed of a collection of the tracking length, the floating object size, the tracking start time, the tracking region, and the quality of movement trajectory information calculated as described above. The data converting unit 2431 creates the observation specification 2503-2 from the time-series data 2501-2 by the same method.

Next, the confidence level prediction model learning unit 243 creates one new training data 252-1 from one training data 250-1 in the following manner. First, the confidence level prediction model learning unit 243 inputs the time-series data 2501-1 included by the training data 250-1 into the learned identification model 234, and acquires the result of estimation of a floating object type finally output from the identification model 234. Next, the confidence level prediction model learning unit 243 compares the floating object type represented by the result of estimation by the identification model 234 with the floating object type 2502-1 included by the training data 250-1 (Block 251). Next, the confidence level prediction model learning unit 243 creates a set of the confidence level 2521-1 set to a value corresponding to the comparison result and the observation specification 2503-1 included by the training data 250-1, as the training data 252-1. The abovementioned value corresponding to the comparison result may be a value already described with reference to FIG. 6. The confidence level prediction model learning unit 243 creates one new training data from the training data 250-2 by the same method. As a result, 2×n training data such as the training data 252-1 are generated from n training data 250.

The confidence level prediction model learning unit 243 uses the training data 252-1 and the like created in the above manner to generate, by machine learning, the confidence level prediction model 235 for which an input is the observation specification of time-series data representing the movement trajectory of a floating object obtained by observation and an output is the confidence level of an estimation result by the identification model 234 estimated from the time-series data relating to the abovementioned observation specification.

Thus, according to the modified example 4, it is possible to increase the number of training data to be used for learning of the confidence level prediction model 235. In general, in the inspection of a foreign object in a liquid encapsulated in a container, it is rate that a foreign object is mixed, so that the number of time-series data representing the movement trajectories of foreign objects is small. Furthermore, in a case where the accuracy of foreign object identification is high, the number of time-series data to be incorrect (time-series data identified as foreign object even though originally air bubble, or time-series data identified as air bubble even though originally foreign object) is even smaller. According to the modified example 4, a large number of training data can be created from such a small number of time-series data.

Modified Example 5

Figure 12:
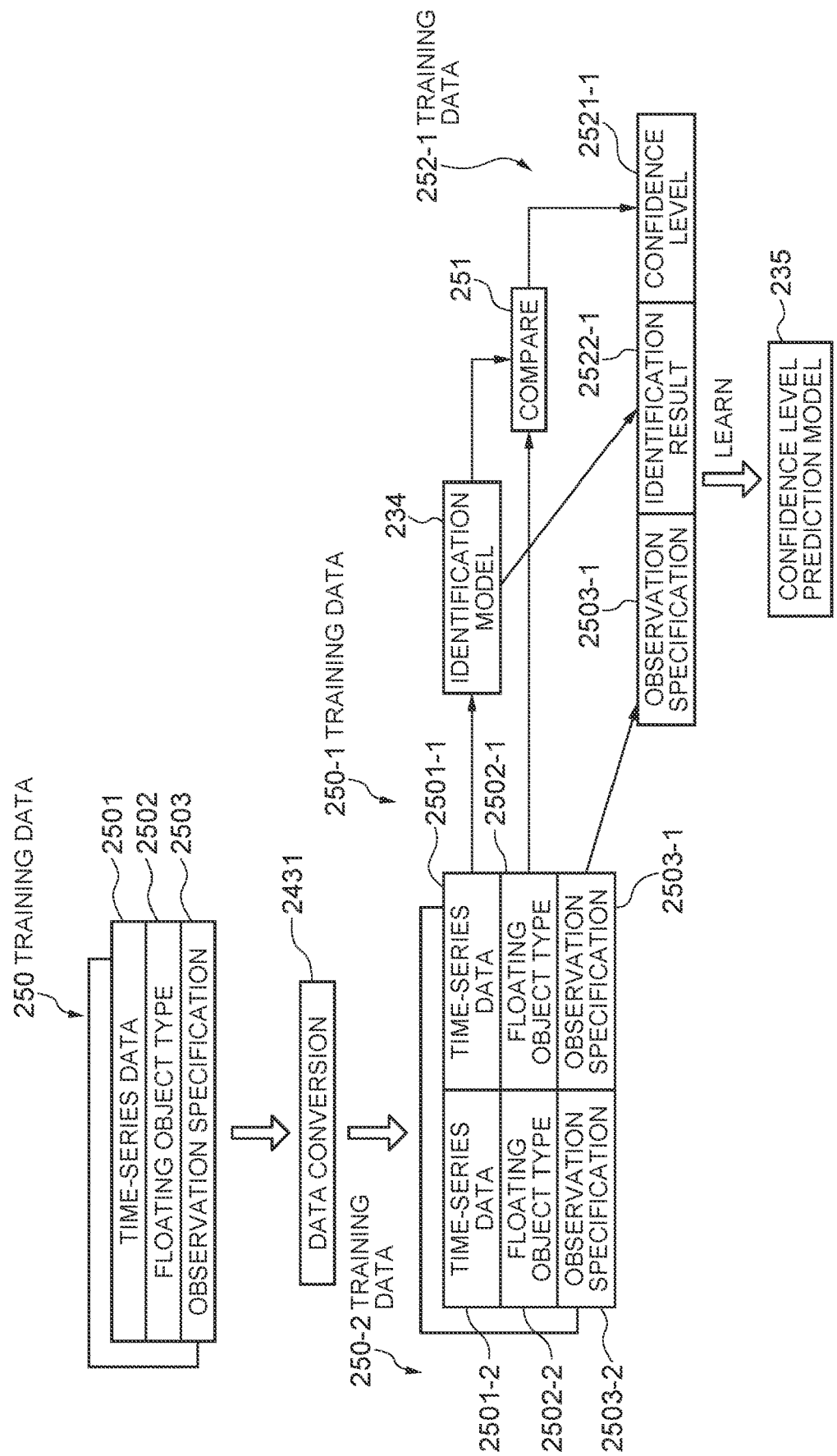
FIG. 12 is a schematic diagram showing another example of the method for creating training data used in machine learning of a confidence level prediction model in a modified example 5 in the first example embodiment of the present invention.

In a modified example 5, the confidence level prediction model learning unit 243 uses the result of identification from time-series data using the identification model 234 for learning of the confidence level prediction model 235. FIG. 12 is a schematic diagram showing an example of a method for creating training data used for machine learning of the confidence level prediction model 235 in the modified example 5. In FIG. 12, the same reference numerals as in FIG. 11 denote the same parts, reference numeral 252-1A denotes training data, and reference numeral 2522-1 denotes the identification result by the identification model 234. Referring to FIG. 12, the confidence level prediction model learning unit 243 creates one new training data 252-1A from one training data 250-1 in the following manner. First, the confidence level prediction model learning unit 243 inputs the time-series data 2501-1 included by the training data 250-1 into the learned identification model 234, and acquires the estimation result 2522-1 output from the identification model 234. Next, the confidence level prediction model learning unit 243 creates the confidence level 2521-1 corresponding to the result of comparison between the floating object type represented by the estimation result 2522-1 and the floating object type included by the training data 250-1 (Block 251). Then, the confidence level prediction model learning unit 243 creates a set of confidence level 2521-1, observation specification 2503-1 in the training data 250-1, and estimation result 2522-1, as the training data 252-1A.

The confidence level prediction model learning unit 243 is configured to use the training data 252-1A and the like created in the above manner to generate, by machine learning, the confidence level prediction model 235 for which an input is a set of the observation specification of time-series data representing the movement trajectory of a floating object obtained by observation and the estimation result 2522-1 output from the identification model 234 when the time-series data is input into the identification model 234 and an output is the confidence level of an estimation result by the identification model 234 estimated from the time-series data relating to the observation specification.

Further, the determining unit 244 may use the estimation result 2522-1 by the identification model 234 for prediction of the confidence level. For example, the determining unit 244 inputs a set of an observation specification list of time-series data representing the movement trajectory of a floating object included by the tracking information 233 and the estimation result 2522-1 output from the identification model 234 when the time-series data is input into the identification model 234, into the learned confidence level prediction model 235, and acquires the confidence level of an estimation result by the identification model 234 output from the confidence level prediction model 235.

Figure 13:
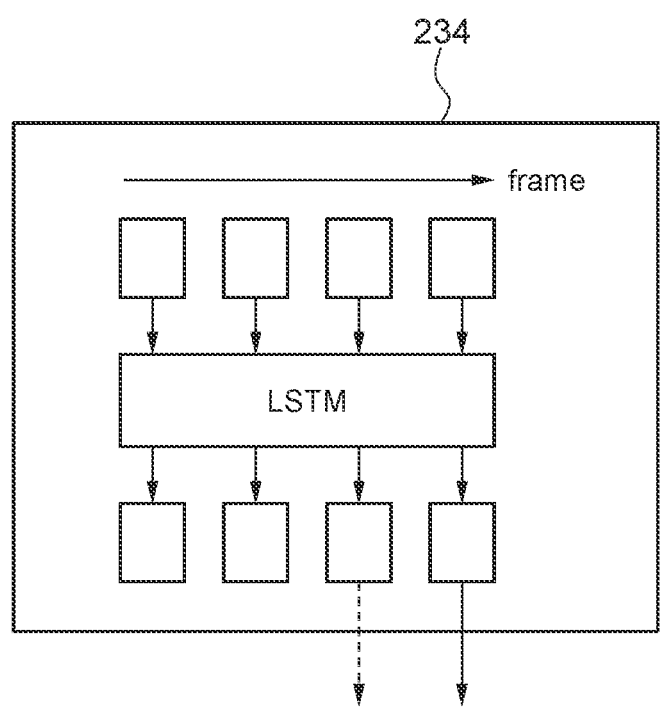
FIG. 13 is a schematic diagram showing an example of an identification model used in a modified example 6 in the first example embodiment of the present invention.

In the modified examples 4 and 5 described above, the confidence level prediction model learning unit 243 acquires the estimation result 2522-1 by inputting the time-series data 2501-1 into the learned identification model 234. However, a method for acquiring the estimation result 2522-1 estimated from the partial time-series data 2501-1 is not limited to the above. For example, with the confidence level prediction model 235 configured to output an identification result based on a feature value of time-series data up to the halfway, the confidence level prediction model learning unit 243 may input the whole time-series data 2501 containing the time-series data 2501-1 into the learned identification model 234 and acquire the estimation result 2522-1 estimated from partial time-series data corresponding to the time-series data 2501-1 from the identification model 234. An example of the identification model 234 having the configuration as described above is shown in a schematic diagram of FIG. 13. Referring to FIG. 13, for example, the identification model 234 is configured by LSTM and is configured to be able to output an identification result as indicated by a solid line arrow from the final stage and also output an identification result with a feature of frames up to the halfway as indicated by a dashed line arrow from the middle stage.

Second Example Embodiment

Figure 14:
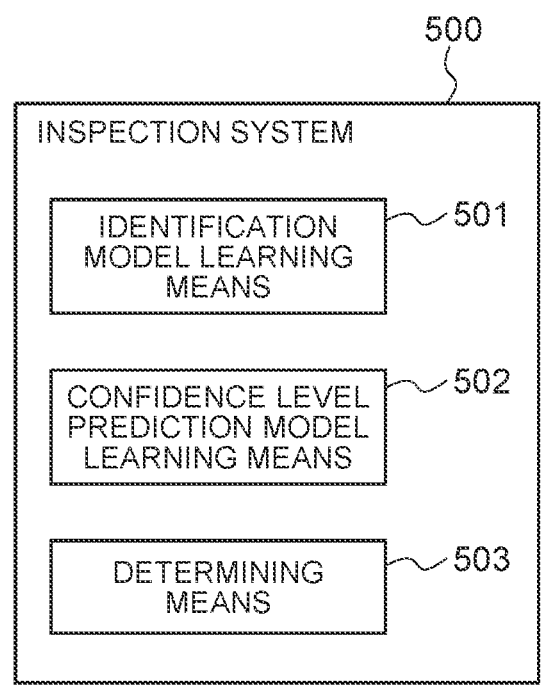
FIG. 14 is a block diagram of an inspection system according to a second example embodiment of the present invention.

FIG. 14 is a block diagram of an inspection system 500 according to a second example embodiment of the present invention. Referring to FIG. 14, the inspection system 500 includes an identification model learning means 501, a confidence level prediction model learning means 502, and a determining means 503.

The identification model learning means 501 is configured to use time-series data representing the movement trajectory of a target object obtained by observation and the type of the target object as first training data, and learn an identification model that estimates the type of a target object from time-series data representing the movement trajectory of the target object obtained by observation. The identification model learning means 501 can be configured, for example, in the same manner as the identification model learning unit 242 of FIG. 2, but is not limited thereto.

The confidence level prediction model learning means 502 is configured to use time-series data representing the movement trajectory of a target object obtained by observation, the observation specification thereof, and the type of the target object as second training data, and learn a confidence level prediction model that predicts the confidence level of an estimation result by an identification model from the observation specification of time-series data representing the movement trajectory of a target object obtained by observation. The confidence level prediction model learning means 502 can be configured, for example, in the same manner as the confidence level prediction model learning unit 243 of FIG. 2, but is not limited thereto.

The determining means 503 is configured to use the learned identification model, and estimate the type of a target object from time-series data representing the movement trajectory of the target object obtained by observation. The determining means 503 is also configured to use the learned confidence level prediction model, and predict the confidence level of an estimation result by the identification model from the observation specification of time-series data. The determining means 503 can be configured, for example, in the same manner as the determining unit 244 of FIG. 2, but is not limited thereto.

The inspection system 500 configured as described above operates in the following manner. That is to say, first, the identification model learning means 501 uses time-series data representing the movement trajectory of a target object obtained by observation and the type of the target object as first training data, and learns an identification model that estimates the type of a target object from time-series data representing the movement trajectory of the target object obtained by observation. Next, the confidence level prediction model learning means 502 uses time-series data representing the movement trajectory of a target object obtained by observation, the observation specification thereof, and the type of the target object as second training data, and learns a confidence level prediction model that predicts the confidence level of an estimation result by the identification model from the observation specification of time-series data representing the movement trajectory of a target object obtained by observation. Next, the determining means 503 uses the learned identification model to estimate the type of a target object from time-series data representing the movement trajectory of the target object obtained by observation, and also uses the learned confidence level prediction model to predict the confidence level of an estimation result by the identification model from the observation specification of time-series data.

According to the inspection system 500 that is configured and operates as described above, even if time-series data represent a plurality of movement trajectories similar to each other obtained by observation from a plurality of target objects of different types, when the observation specifications thereof are different from each other, it is possible to differentiate confidence levels as a result of estimation from the time-series data. The reason is that the confidence level prediction model learning means 502 uses time-series data representing the movement trajectory of a target object obtained by observation, the observation specification thereof, and the type of the target object as second training data and leans a confidence level prediction model that predicts the confidence level of an estimation result by the identification model from the observation specification of time-series data representing the movement trajectory of a target object obtained by observation. Moreover, the reason is that the determining means 503 uses the learned confidence level prediction model and predicts the confidence level of an estimation result by the identification model from the observation specification of the time-series data.

Although the present invention has been described above using some example embodiments and modified examples, the present invention is not limited to the above example embodiments and modified examples, and can be changed in various manners. For example, the present invention can be combination of the above example embodiments and modified examples. For example, the present invention includes an inspection system that performs in parallel or alternately the operation to perform identification and confidence level prediction using the leaned identification model and confidence level model described in the first example embodiment and the operation of performing identification and confidence level prediction using the learned identification model and confidence level prediction model described in any of the modified examples.

INDUSTRIAL APPLICABILITY

The present invention can be used in a general inspection system that estimates the type of a target object from time-series data representing the movement trajectory of the target object obtained by observation. For example, the present invention can be applied to an inspection system that inspects for the presence of a foreign object in a liquid encapsulated in a container. Moreover, the present invention can be applied to a preclinical trial system for investigating the safety of a pharmaceutical by determining the presence or absence of an anomaly of a mouse and the like from time-series data representing the movement trajectory of the mouse and the like.

The whole or part of the example embodiments disclosed above can be described as, but not limited to, the following supplementary notes.

Supplementary Note 1

An inspection system comprising:
an identification model learning means that uses time-series data representing a movement trajectory of a target object obtained by observation and a type of the target object as first training data, and thereby learns an identification model estimating a type of a target object from time-series data representing a movement trajectory of the target object obtained by observation;
a confidence level prediction model learning means that uses time-series data representing a movement trajectory of a target object obtained by observation, an observation specification thereof, and a type of the target object as second training data, and thereby learns a confidence level prediction model predicting a confidence level of an estimation result by the identification model from an observation specification of time-series data representing a movement trajectory of a target object obtained by observation; and
a determining means that uses the learned identification model to estimate a type of a target object from time-series data representing a movement trajectory of the target object obtained by observation, and uses the learned confidence level prediction model to predict a confidence level of an estimation result by the identification model from an observation specification of the time-series data.

Supplementary Note 2

The inspection system according to Supplementary Note 1, wherein
when a type of a target object estimated from the time-series data in the second training data by using the learned identification model does not coincide with the type of the target object in the second training data, the confidence level prediction model learning means acquires a confidence level to be a lower value compared with when coincide, and uses the acquired confidence level and the observation specification in the second training data as third training data to learn the confidence level prediction model.

Supplementary Note 3

The inspection system according to Supplementary Note 1 or 2, wherein
the observation specification includes at least one of a length of the movement trajectory, a size of the target object, start time of the movement trajectory, an observation place of the movement trajectory, and a quality of the time-series data.

Supplementary Note 4

The inspection system according to any of Supplementary Notes 1 to 3, wherein
the determining means modifies a result of determination of the type of the target object based on a result of determination of the confidence level.

Supplementary Note 5

The inspection system according to any of Supplementary Notes 1 to 4, wherein
the confidence level prediction model learning means learns the confidence level prediction model by using a predetermined output obtained by inputting the time-series data in the second training data into the learned identification model.

Supplementary Note 6

The inspection system according to any of Supplementary Notes 1 to 5, wherein
the identification model learning means further learns the learned identification model by using the confidence level predicted by the learned confidence degree prediction model for control of learning.

Supplementary Note 7

The inspection system according to any of Supplementary Notes 1 to 6, wherein:
the confidence level prediction model learning means converts the second training data to a plurality of new training data, each of the new training data including one time-series data after conversion of the time-series data in the second training data to a plurality of new time-series data, the type of the target object in the second training data, and an observation specification of the one time-series data; and
the confidence level prediction model learning means uses the new training data to learn the confidence level prediction model.

Supplementary Note 8

The inspection system according to Supplementary Note 7, wherein
the confidence level prediction model learning means performs machine-learning of the confidence level prediction model by using an identification result obtained by inputting the time-series data in the new training data into the learned identification model.

Supplementary Note 9

An inspection method comprising:
using time-series data representing a movement trajectory of a target object obtained by observation and a type of the target object as first training data, and thereby learning an identification model estimating a type of a target object from time-series data representing a movement trajectory of the target object obtained by observation;
using time-series data representing a movement trajectory of a target object obtained by observation, an observation specification thereof, and a type of the target object as second training data, and thereby learning a confidence level prediction model predicting a confidence level of an estimation result by the identification model from an observation specification of time-series data representing a movement trajectory of a target object obtained by observation; and
using the learned identification model to estimate a type of a target object from time-series data representing a movement trajectory of the target object obtained by observation, and using the learned confidence level prediction model to predict a confidence level of an estimation result by the identification model from an observation specification of the time-series data.

Supplementary Note 10

A non-transitory computer-readable recording medium having a program recorded thereon, the program comprising instructions for causing a computer to execute processes to:
use time-series data representing a movement trajectory of a target object obtained by observation and a type of the target object as first training data, and thereby learn an identification model estimating a type of a target object from time-series data representing a movement trajectory of the target object obtained by observation;
use time-series data representing a movement trajectory of a target object obtained by observation, an observation specification thereof, and a type of the target object as second training data, and thereby learn a confidence level prediction model predicting a confidence level of an estimation result by the identification model from an observation specification of time-series data representing a movement trajectory of a target object obtained by observation; and
use the learned identification model to estimate a type of a target object from time-series data representing a movement trajectory of the target object obtained by observation, and use the learned confidence level prediction model to predict a confidence level of an estimation result by the identification model from an observation specification of the time-series data.

REFERENCE SIGNS LIST

100 inspection system
110 gripping device
120 lighting device
130 camera device
200 inspection apparatus
300 display device
400 container
401 cap

What is claimed is:

1. An inspection apparatus comprising:
a memory containing program instructions; and
a processor coupled to the memory, wherein the processor is configured to execute the program instructions to:
learn, by using first training data, an identification model estimating a type of a target object from time-series data, representing a movement trajectory of the target object obtained by observation, the first training data including time-series data representing a movement trajectory of a target object obtained by observation and a type of the target object;
learn, by using second training data, a confidence level prediction model predicting a confidence level of an estimation result by the identification model from an observation specification of time-series data representing a movement trajectory of a target object obtained by observation, the second training data including time-series data representing a movement trajectory of a target object obtained by observation, an observation specification thereof, and a type of the target object; and
estimate, by using the learned identification model, a type of a target object from time-series data representing a movement trajectory of the target object obtained by observation, and predict, by using the learned confidence level prediction model, a confidence level of an estimation result by the identification model from an observation specification of the time-series data.

2. The inspection apparatus according to claim 1, wherein the processor is further configured to execute the instructions to:
when a type of a target object estimated from the time-series data in the second training data by using the learned identification model does not coincide with the type of the target object in the second training data, acquire a confidence level to be a lower value compared with when coincide; and
learn the confidence level prediction model by using third training data including the acquired confidence level and the observation specification in the second training data.

3. The inspection apparatus according to claim 1, wherein the observation specification includes at least one of a length of the movement trajectory, a size of the target object, start time of the movement trajectory, an observation place of the movement trajectory, and a quality of the time-series data.

4. The inspection apparatus according to claim 1, wherein the processor is further configured to execute the instructions to
modify a result of determination of the type of the target object based on a result of determination of the confidence level.

5. The inspection apparatus according to claim 1, wherein the processor is further configured to execute the instructions to
learn the confidence level prediction model by using a predetermined output obtained by inputting the time-series data in the second training data into the learned identification model.

6. The inspection apparatus according to claim 1, wherein the processor is further configured to execute the instructions to
further learn the learned identification model by using the confidence level predicted by the learned confidence degree prediction model for control of learning.

7. The inspection apparatus according to claim 1, wherein the processor is further configured to execute the instructions to:
convert the second training data to a plurality of new training data, each of the new training data including one time-series data after conversion of the time-series data in the second training data to a plurality of new time-series data, the type of the target object in the second training data, and an observation specification of the one time-series data; and
learn the confidence level prediction model by using the new training data.

8. The inspection apparatus according to claim 7, wherein the processor is further configured to execute the instructions to
perform machine-learning of the confidence level prediction model by using an identification result obtained by inputting the time-series data in the new training data into the learned identification model.

9. An inspection method comprising:
by a processor, learning, by using first training data, an identification model estimating a type of a target object from time-series data representing a movement trajectory of the target object obtained by observation, the first training data including time-series data representing a movement trajectory of a target object obtained by observation and a type of the target object;
by the processor, learning, by using second training data, a confidence level prediction model predicting a confidence level of an estimation result by the identification model from an observation specification of time-series data representing a movement trajectory of a target object obtained by observation, the second training data including time-series data representing a movement trajectory of a target object obtained by observation, an observation specification thereof, and a type of the target object; and
by the processor, estimating, by using the learned identification model, a type of a target object from time-series data representing a movement trajectory of the target object obtained by observation, and predicting, by using the learned confidence level prediction model, a confidence level of an estimation result by the identification model from an observation specification of the time-series data.

10. A non-transitory computer-readable recording medium having a program recorded thereon, the program comprising instructions for causing a computer to execute processes to:
learn, by using first training data, an identification model estimating a type of a target object from time-series data representing a movement trajectory of the target object obtained by observation, the first training data including time-series data representing a movement trajectory of a target object obtained by observation and a type of the target object;
learn, by using second training data, a confidence level prediction model predicting a confidence level of an estimation result by the identification model from an observation specification of time-series data representing a movement trajectory of a target object obtained by observation, the second training data including time-series data representing a movement trajectory of a target object obtained by observation, an observation specification thereof, and a type of the target object; and estimate, by using the learned identification model, a type of a target object from time-series data representing a movement trajectory of the target object obtained by observation, and predict, by using the learned confidence level prediction model, a confidence level of an estimation result by the identification model from an observation specification of the time-series data.

* * * * *